(12) United States Patent
Terai et al.

(10) Patent No.: US 11,504,809 B2
(45) Date of Patent: Nov. 22, 2022

(54) SINTERED PRODUCT AND LASER MARKING METHOD FOR SINTERED PRODUCT

(71) Applicant: Sumitomo Electric Sintered Alloy, Ltd., Takahashi (JP)

(72) Inventors: Hiroaki Terai, Takahashi (JP); Masayuki Tauchi, Takahashi (JP); Kenji Nawachi, Takahashi (JP)

(73) Assignee: Sumitomo Electric Sintered Alloy, Ltd., Takahashi (JP)

( * ) Notice: Subject to any disclaimer, the term of this patent is extended or adjusted under 35 U.S.C. 154(b) by 381 days.

(21) Appl. No.: 16/629,486

(22) PCT Filed: Jul. 11, 2018

(86) PCT No.: PCT/JP2018/026187
§ 371 (c)(1),
(2) Date: Jan. 8, 2020

(87) PCT Pub. No.: WO2019/017256
PCT Pub. Date: Jan. 24, 2019

(65) Prior Publication Data
US 2020/0147728 A1    May 14, 2020

(30) Foreign Application Priority Data
Jul. 18, 2017   (JP) .............................. JP2017-139182

(51) Int. Cl.
*B23K 26/354*   (2014.01)
*B23K 26/352*   (2014.01)
(Continued)

(52) U.S. Cl.
CPC .............. *B23K 26/354* (2015.10); *B22F 3/10* (2013.01); *B23K 26/3576* (2018.08); *B23K 26/362* (2013.01); *C22C 33/02* (2013.01)

(58) Field of Classification Search
CPC .. B22F 2003/245; B22F 2998/10; B22F 3/10; B22F 3/24; B22F 1/00; B23K 2101/006;
(Continued)

(56) References Cited

U.S. PATENT DOCUMENTS 5,965,042 A * 10/1999 Saitoh ...................... B41M 5/26
                                                         219/121.76
2018/0197054 A1   7/2018 Suzuki

FOREIGN PATENT DOCUMENTS

JP    05-185714 A    7/1993
JP    10-34359 A     2/1998
(Continued)

OTHER PUBLICATIONS

Translation of Cited JPH05185714 (Year: 1993).*
Translation of Cited WO2017002605 (Year: 2017).*

*Primary Examiner* — Dana Ross
*Assistant Examiner* — Joseph W Iskra
(74) *Attorney, Agent, or Firm* — Baker Botts L.L.P.; Michael A. Sartori

(57) ABSTRACT

A method according to one aspect of the present disclosure is a laser marking method for a powder compact containing metal powder, which includes: a first step of scanning with laser light of first power which is weaker over a predetermined area in a surface of the powder compact, to melt and smooth inside of the predetermined area; and a second step of scanning with laser light of second power which is greater, to form a dot formed of a recess of a predetermined depth at a predetermined location in the predetermined area.

9 Claims, 23 Drawing Sheets

(51) Int. Cl.
*B22F 3/10* (2006.01)
*B23K 26/362* (2014.01)
*C22C 33/02* (2006.01)

(58) Field of Classification Search
CPC .......... B23K 2101/008; B23K 2103/04; B23K 26/00; B23K 26/0006; B23K 26/0622; B23K 26/08; B23K 26/0876; B23K 26/354; B23K 26/355; B23K 26/3576; B23K 26/36; B23K 26/362; B41M 5/24; B41M 5/262; C22C 33/02; C22C 38/00
USPC ...................................................... 219/121.6
See application file for complete search history.

(56) References Cited

FOREIGN PATENT DOCUMENTS

| | | |
|---|---|---|
| JP | 2001-147985 A | 5/2001 |
| JP | 2001-334753 A | 12/2001 |
| JP | 2002-137072 A | 5/2002 |
| JP | 2008-012567 A | 1/2008 |
| JP | 2011-136347 A | 7/2011 |
| WO | 2017/002605 A1 | 1/2017 |

\* cited by examiner

FIG. 5

| | reference value | first step | second step | | third step |
|---|---|---|---|---|---|
| | | | first time | second time | |
| laser power | 34W | 50% | 100% | 100% | 50% |
| scan speed | 700mm/s | 300% | 40% | 40% | 350% |
| marking pulse frequency | 20μs | 50% | 100% | 100% | 50% |
| line width | 0.060mm | 0.060mm | 0.060mm | 0.060mm | 0.060mm |
| marking time | total:2.09s | 0.22s | 0.72s | 0.72s | 0.43s |

FIG. 11
without sizing - dotted portion (second step portion)
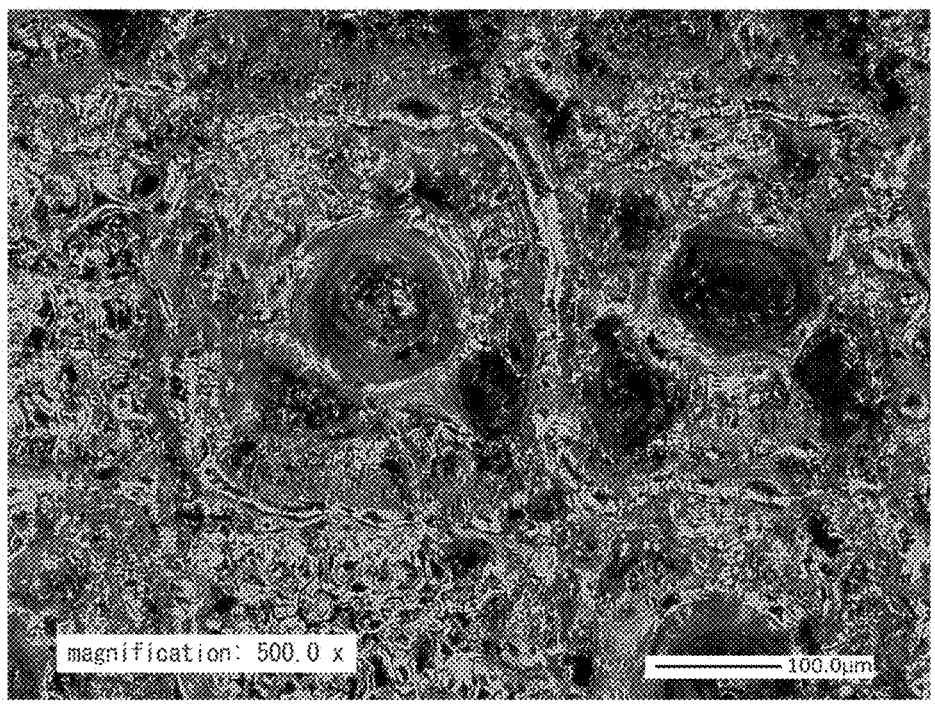
without sizing - dotted portion (second step portion)
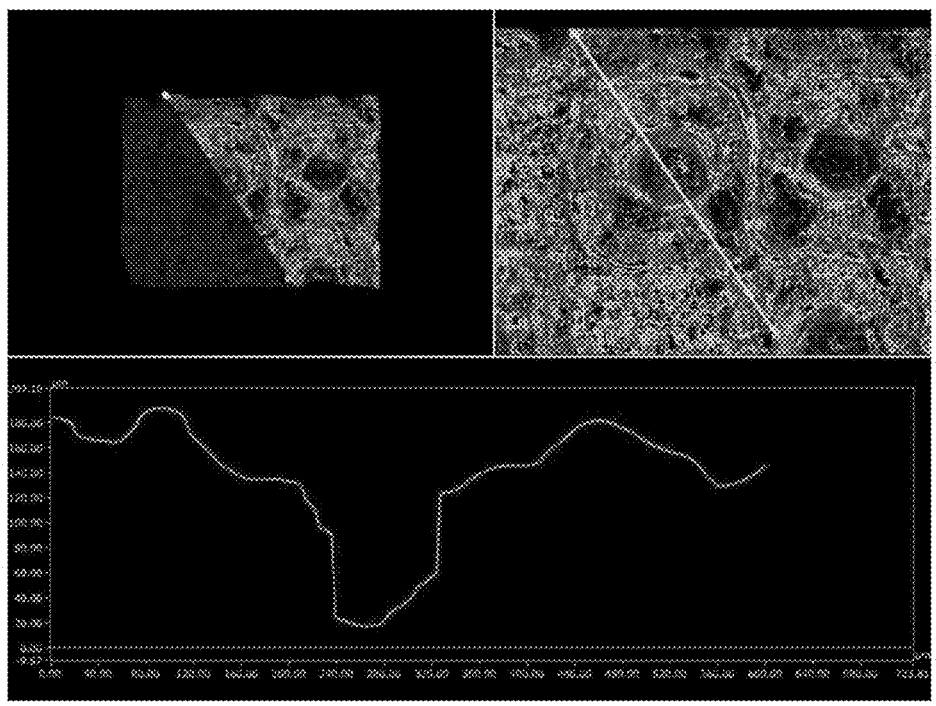

FIG. 12
without sizing - non-dotted portion (third step portion)
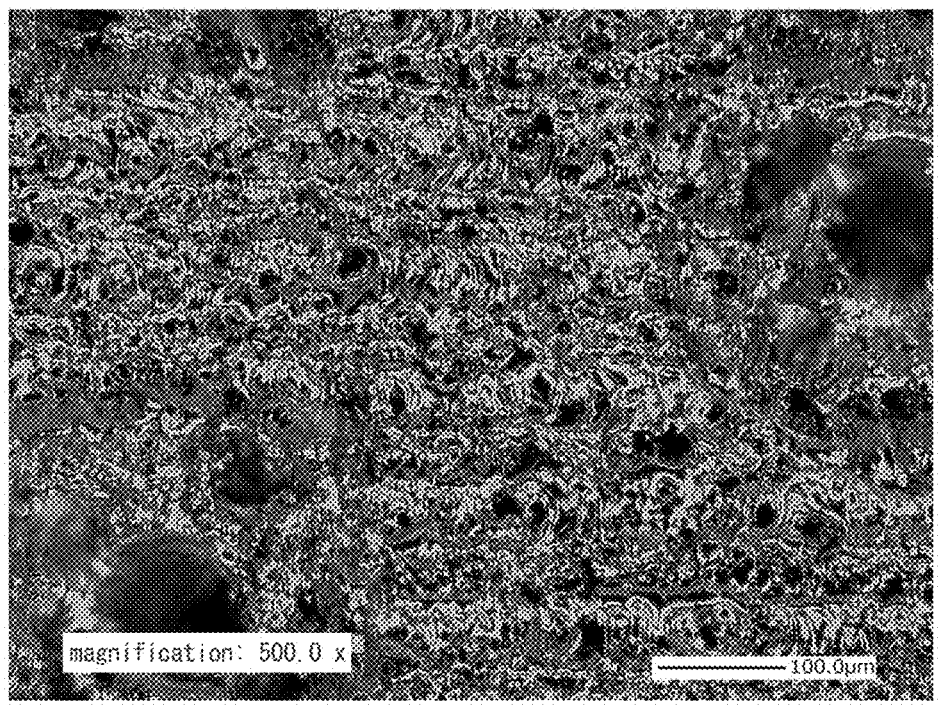
without sizing - non-dotted portion (third step portion)
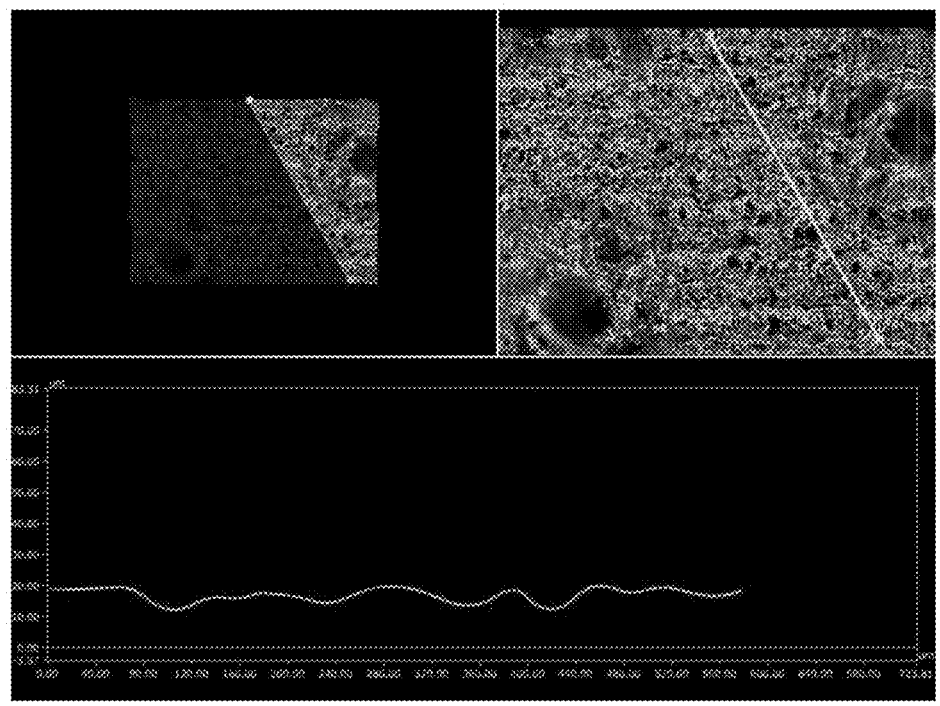

FIG. 13
without sizing - non-processed portion (outside the first step area)
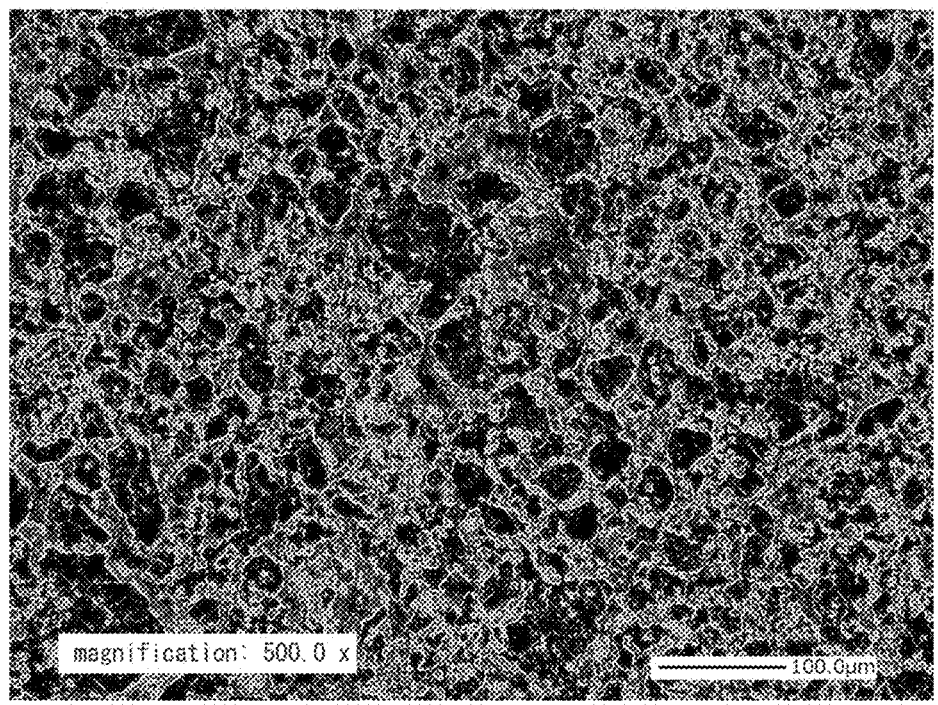
without sizing - non-processed portion (outside the first step area)
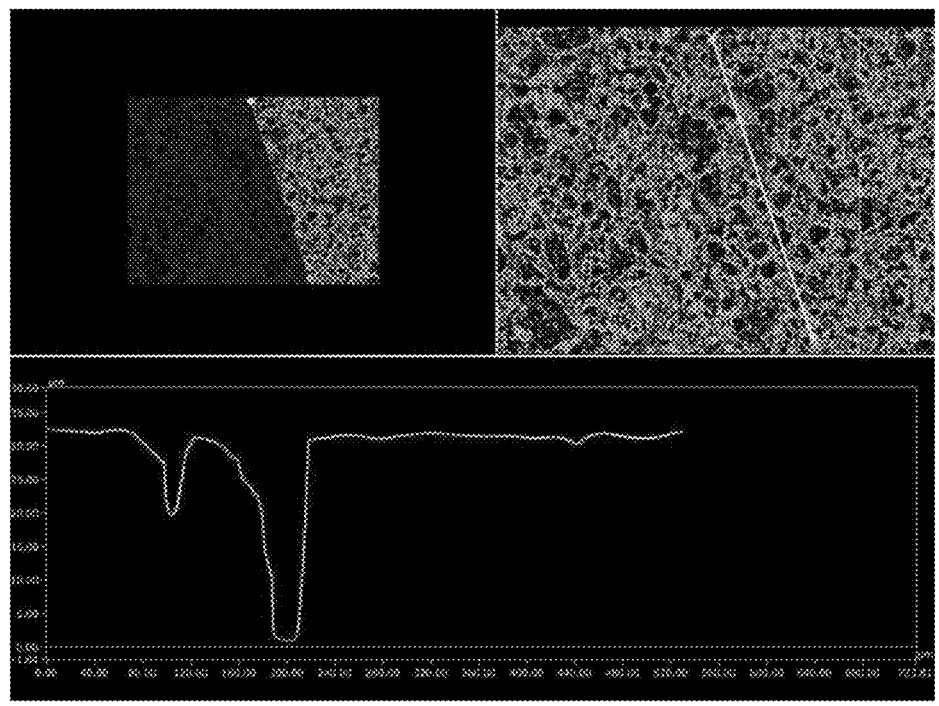

FIG. 15
with sizing - dotted portion (second step portion)
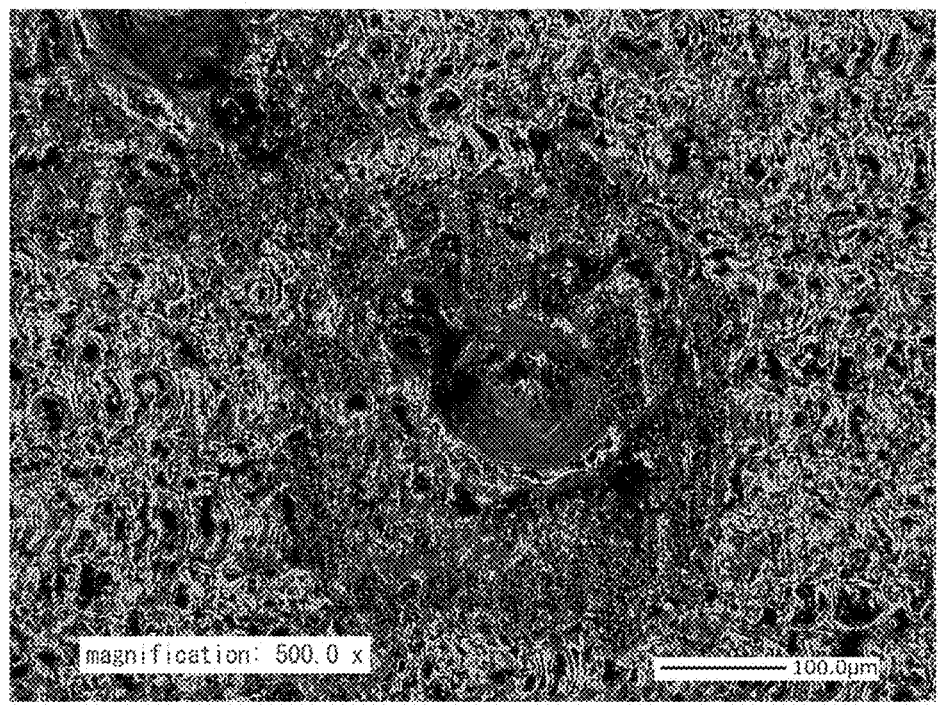
with sizing - dotted portion (second step portion)
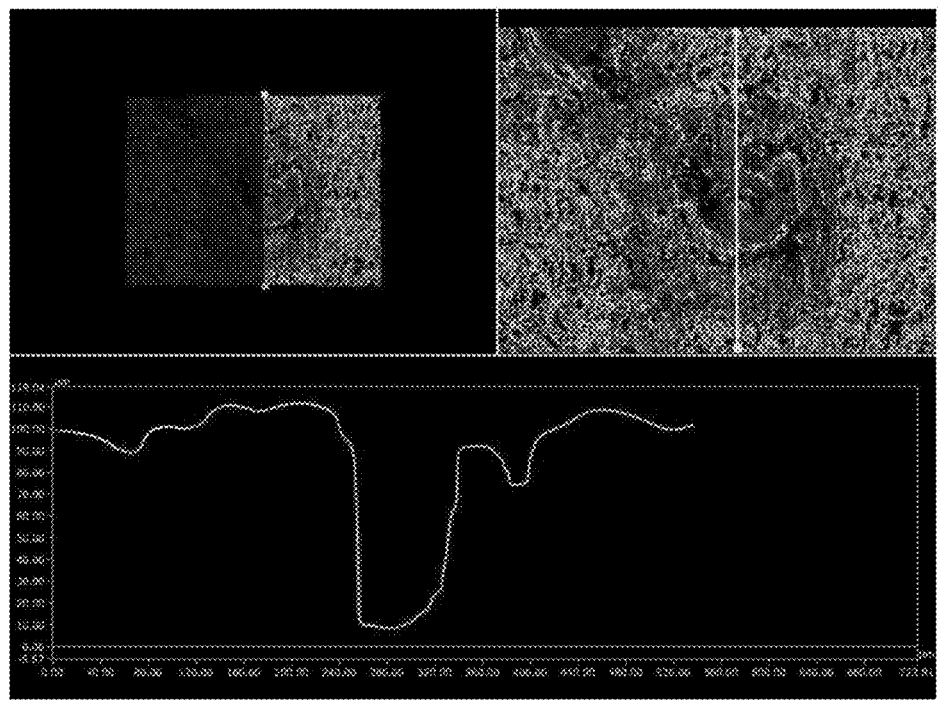

FIG. 16
with sizing - non-dotted portion (third step portion)
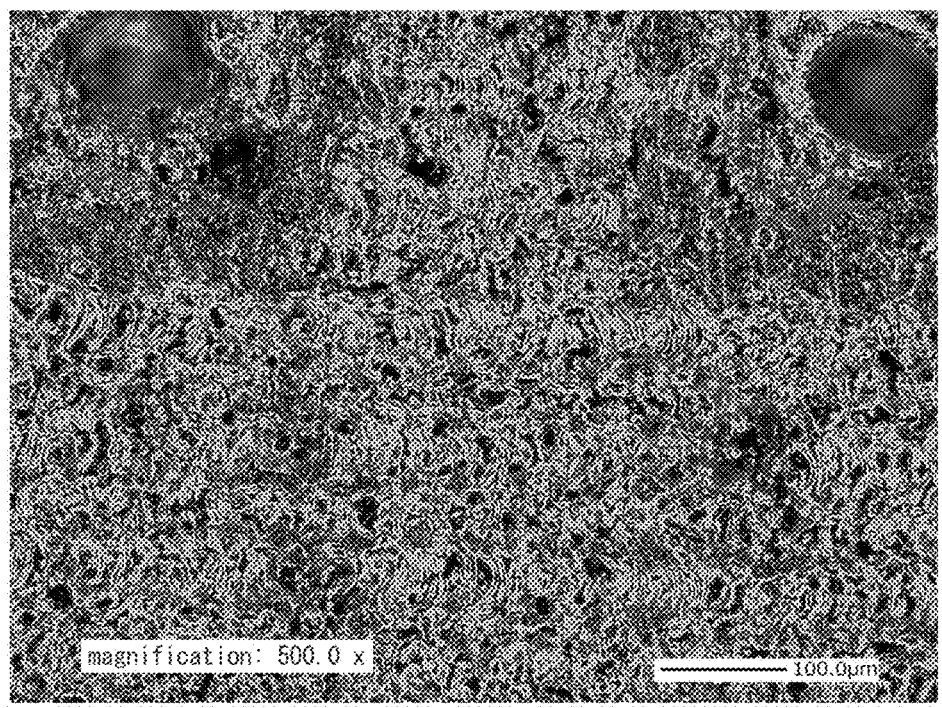
with sizing - non-dotted portion (third step portion)
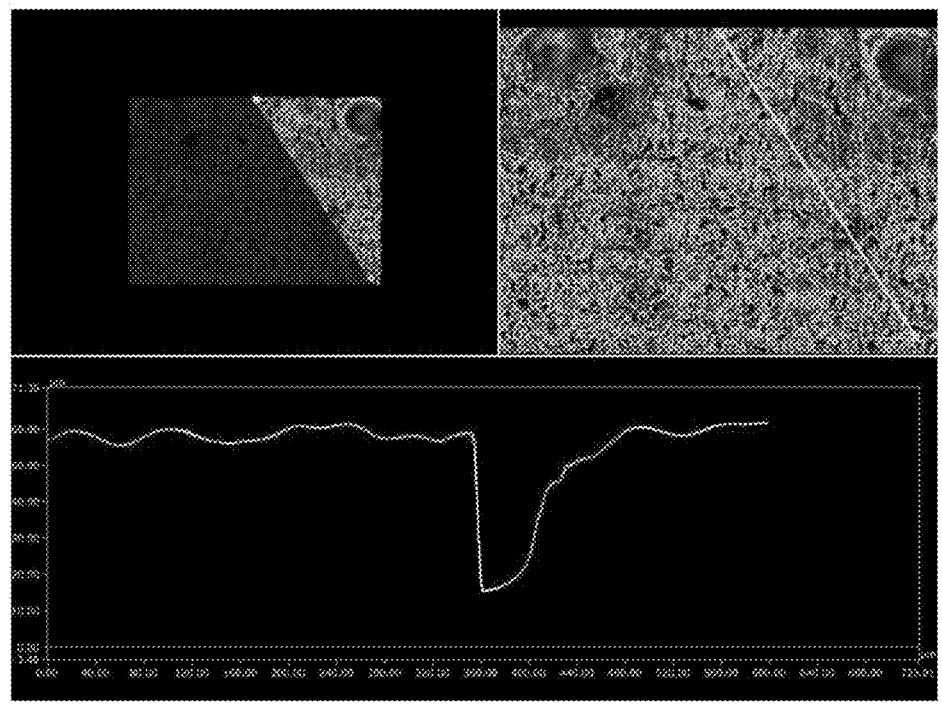

FIG. 17
with sizing - non-processed portion
(outside the first step area)
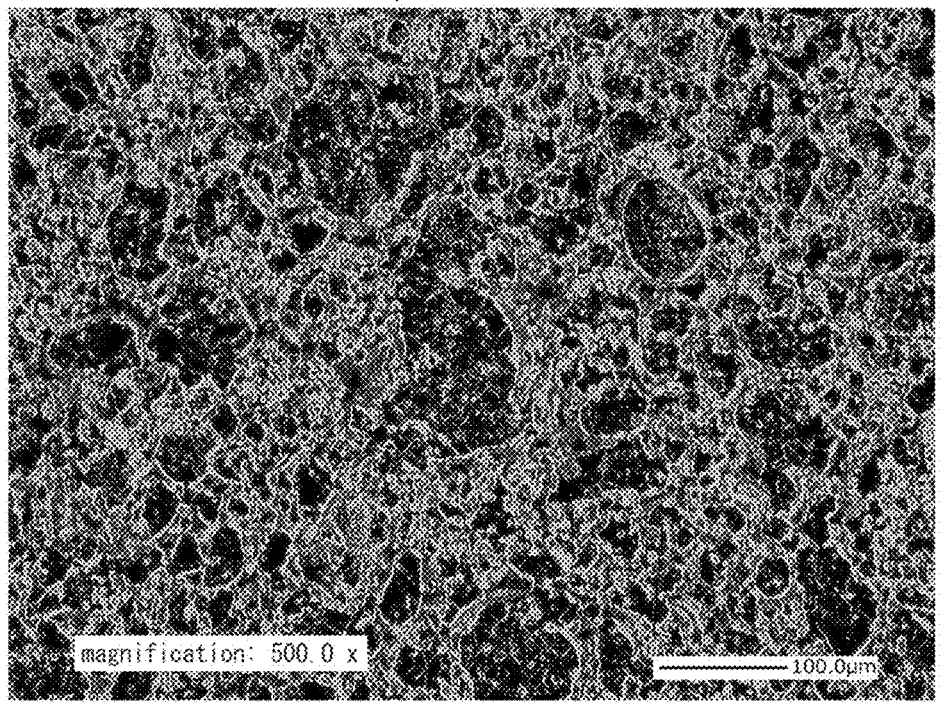
with sizing - non-processed portion
(outside the first step area)
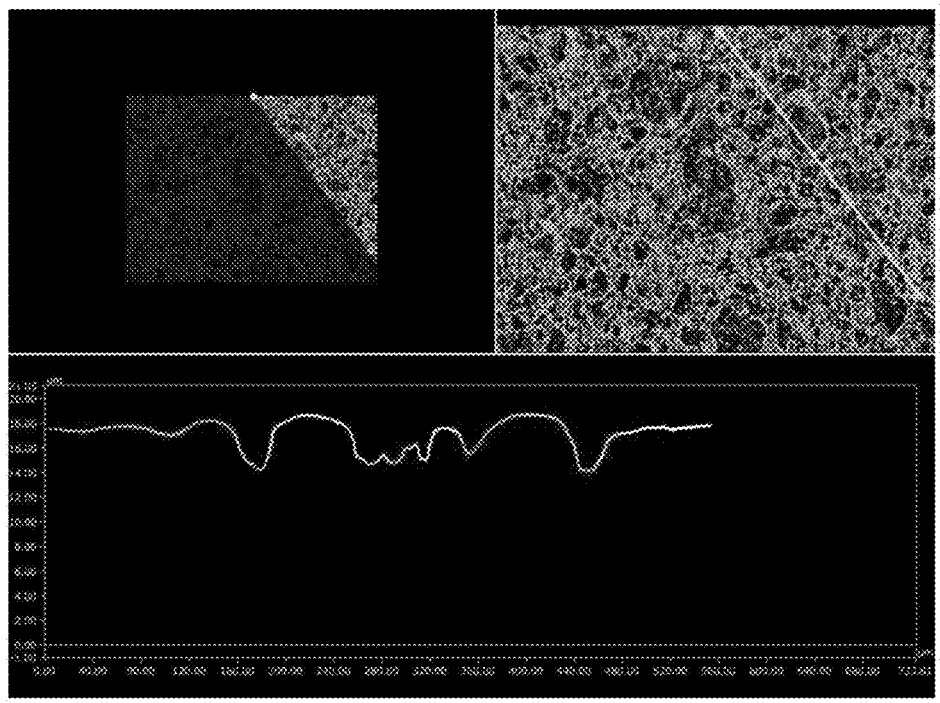

FIG. 18
marked before sintering
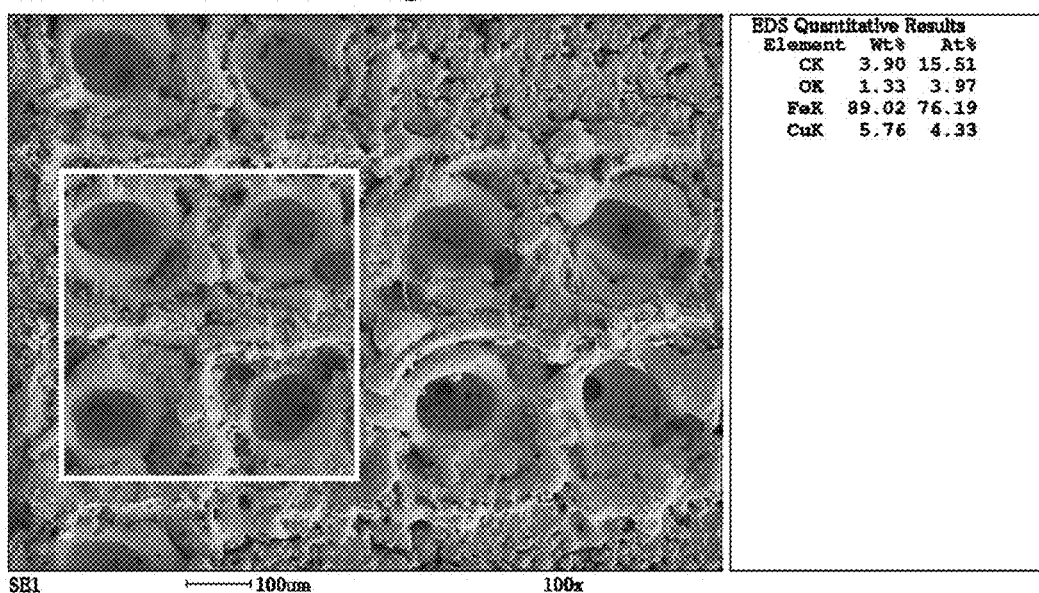
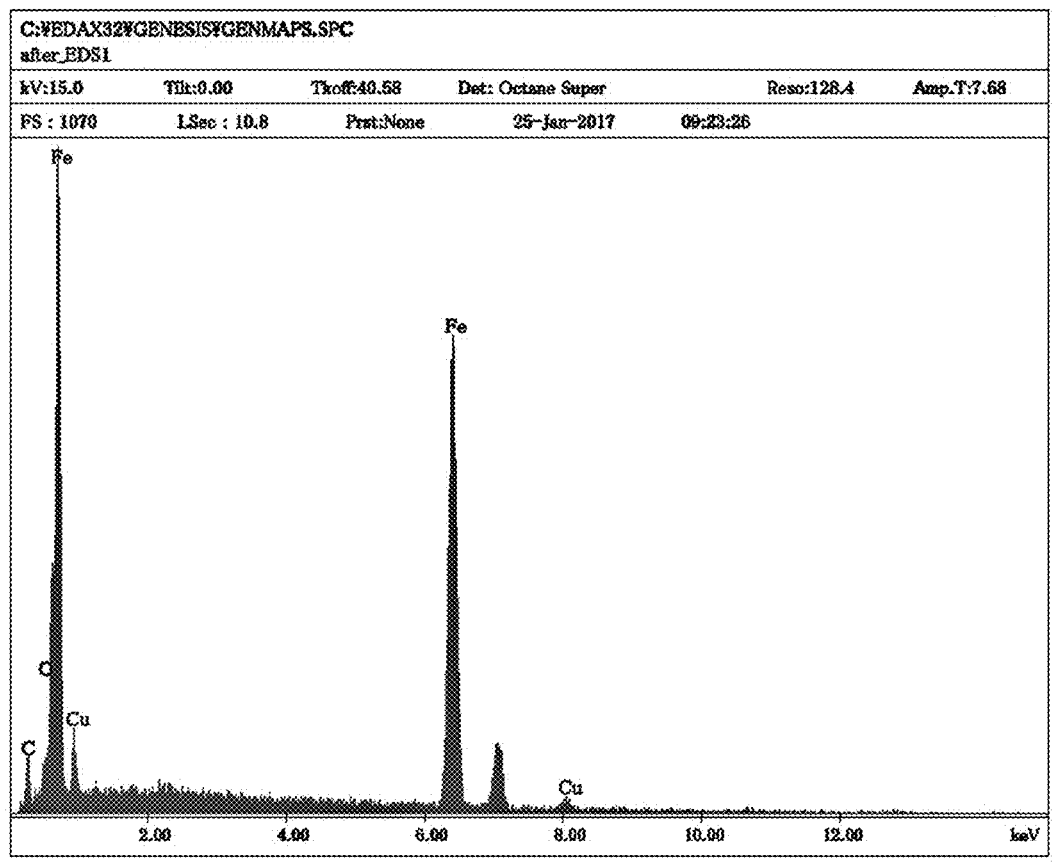

FIG. 19
marked before sintering
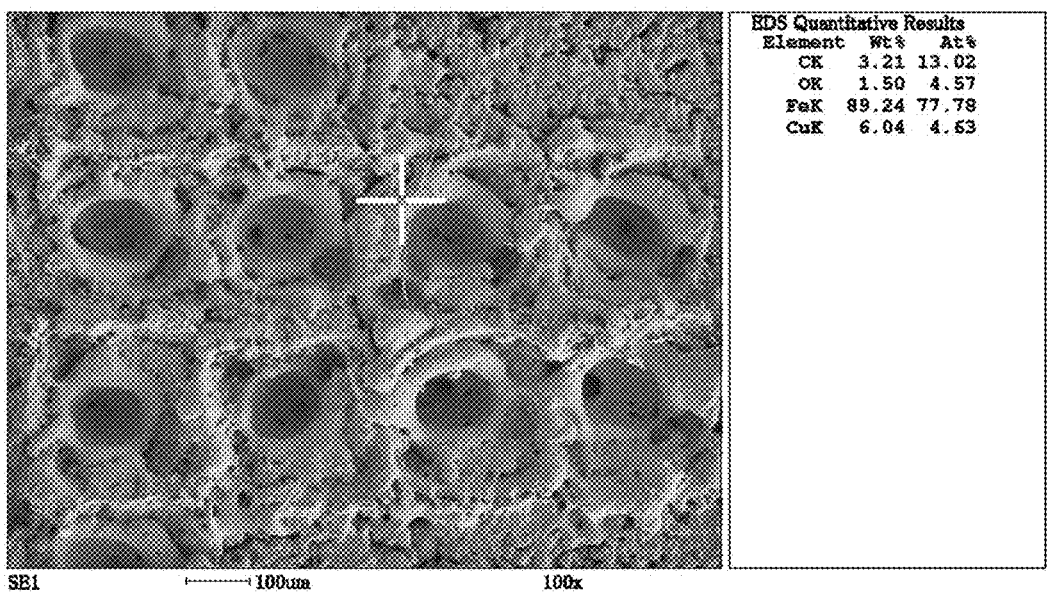
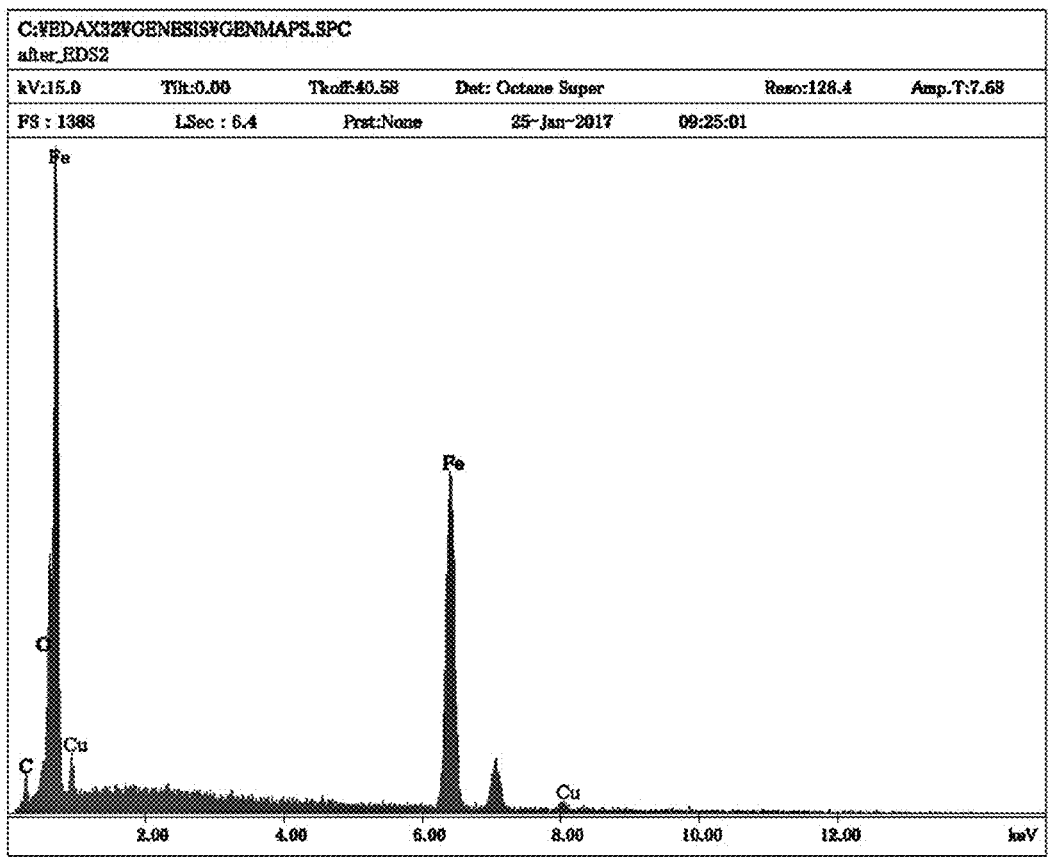

FIG. 20
portion excluding marking portion
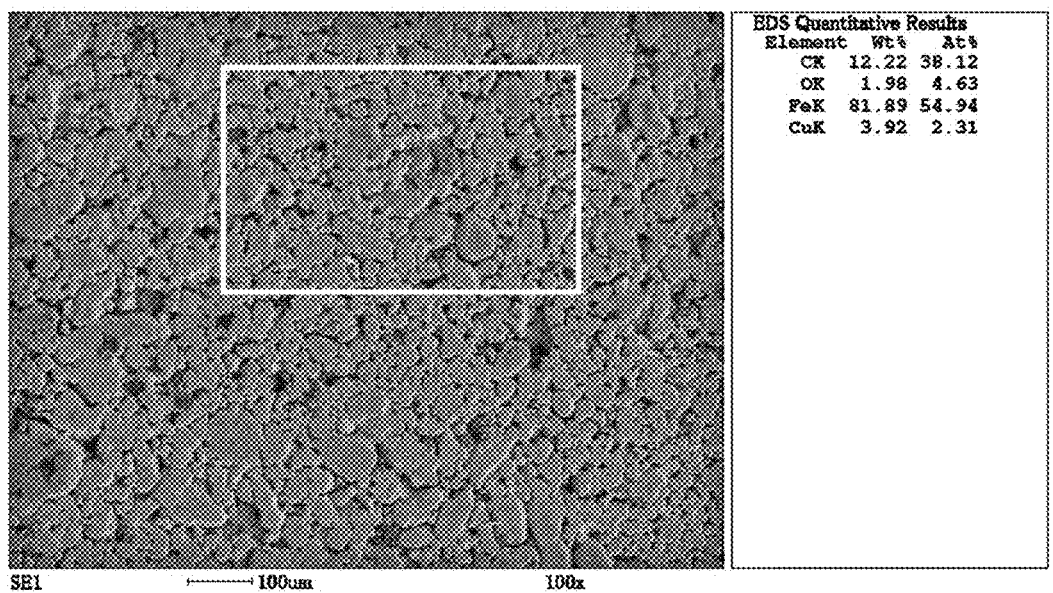
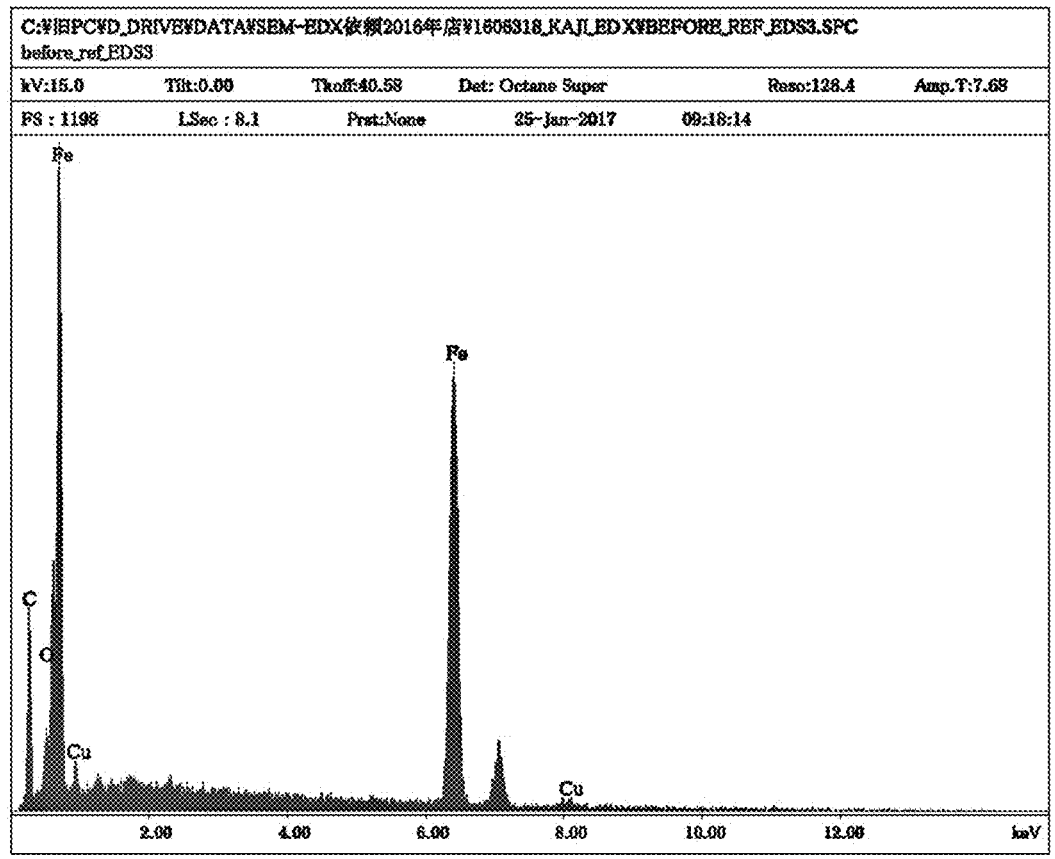

FIG. 21
portion excluding marking portion
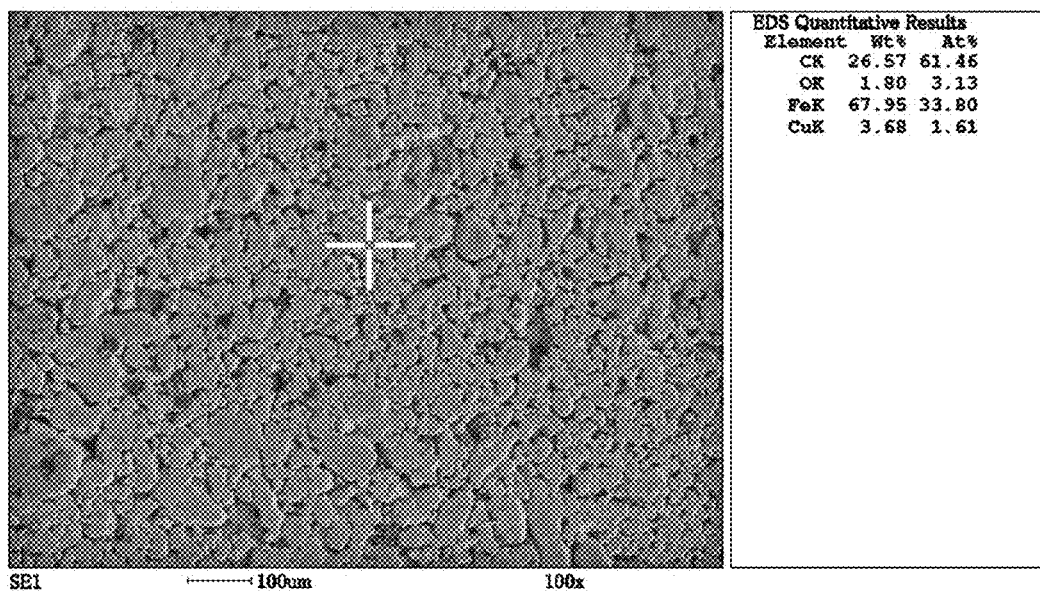
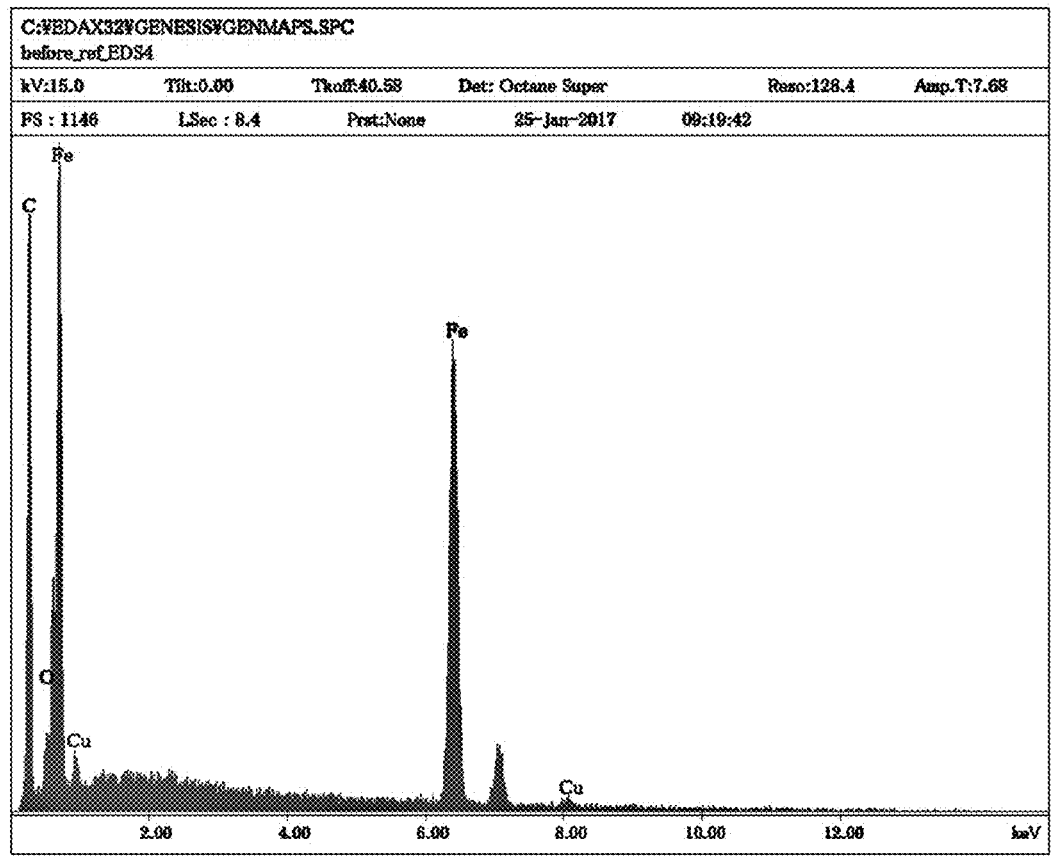

FIG. 22
marked after sintering
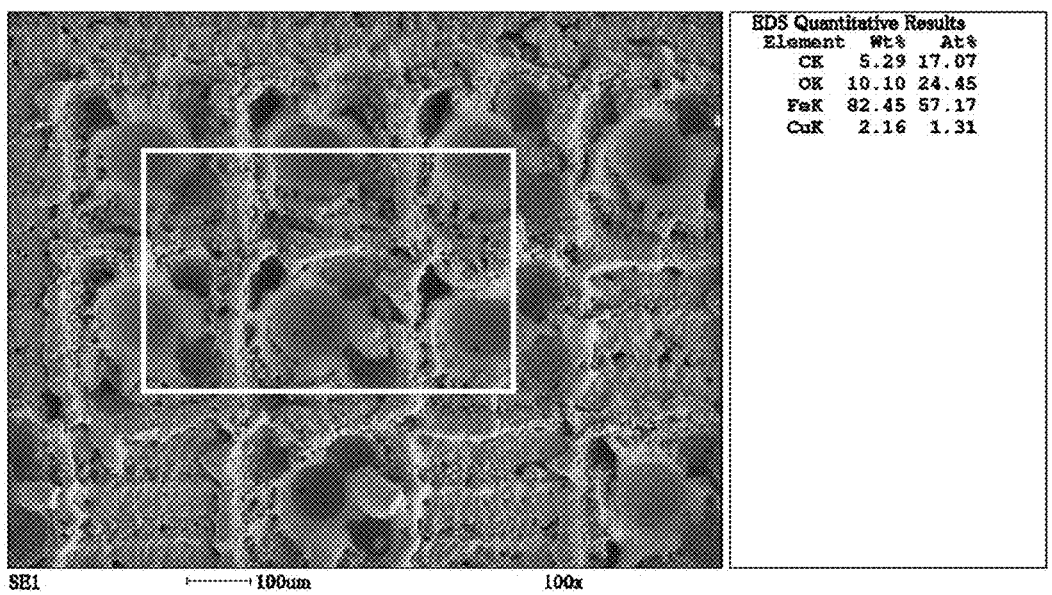
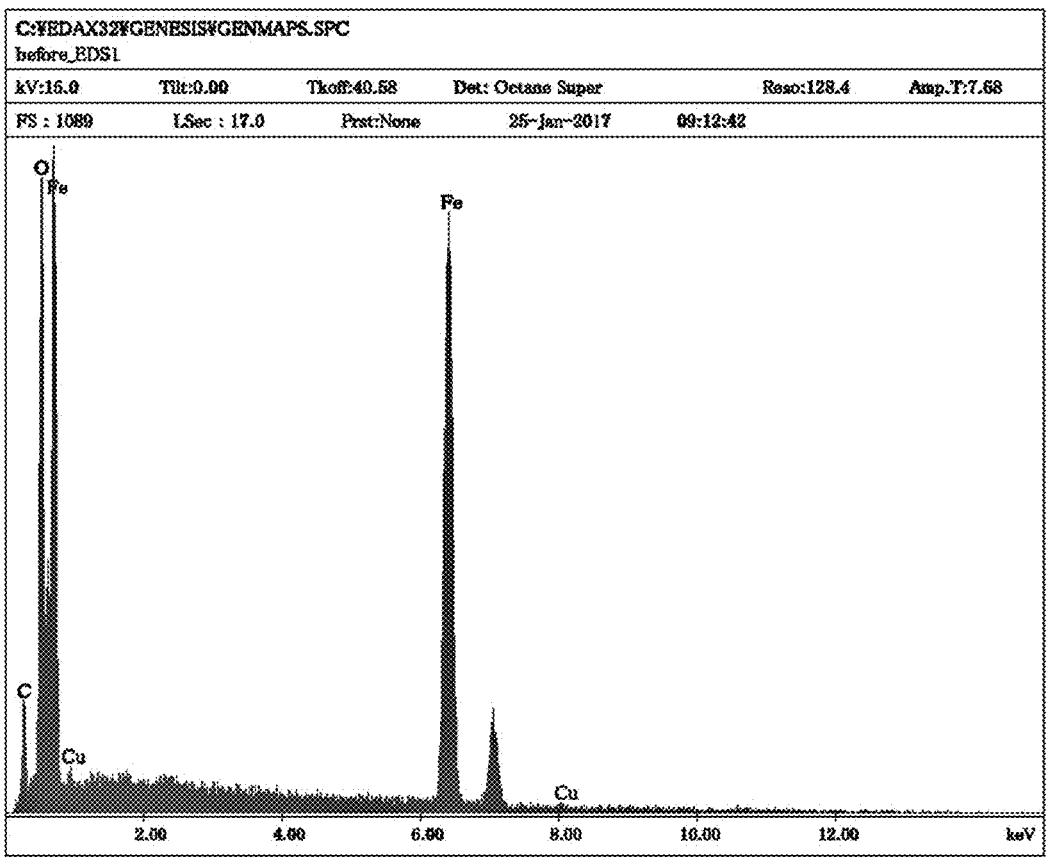

FIG. 23
marked after sintering
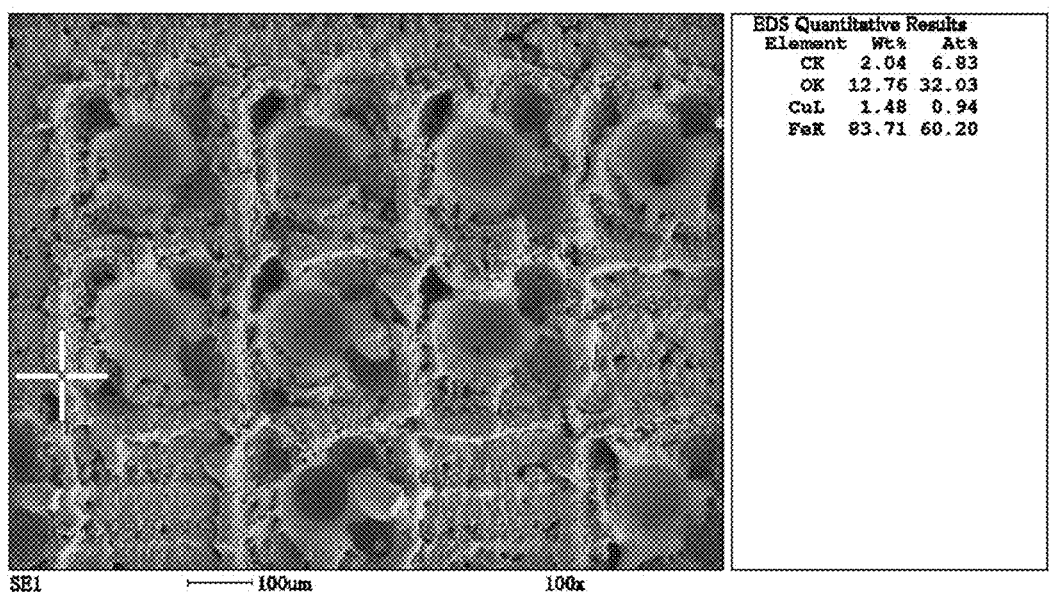
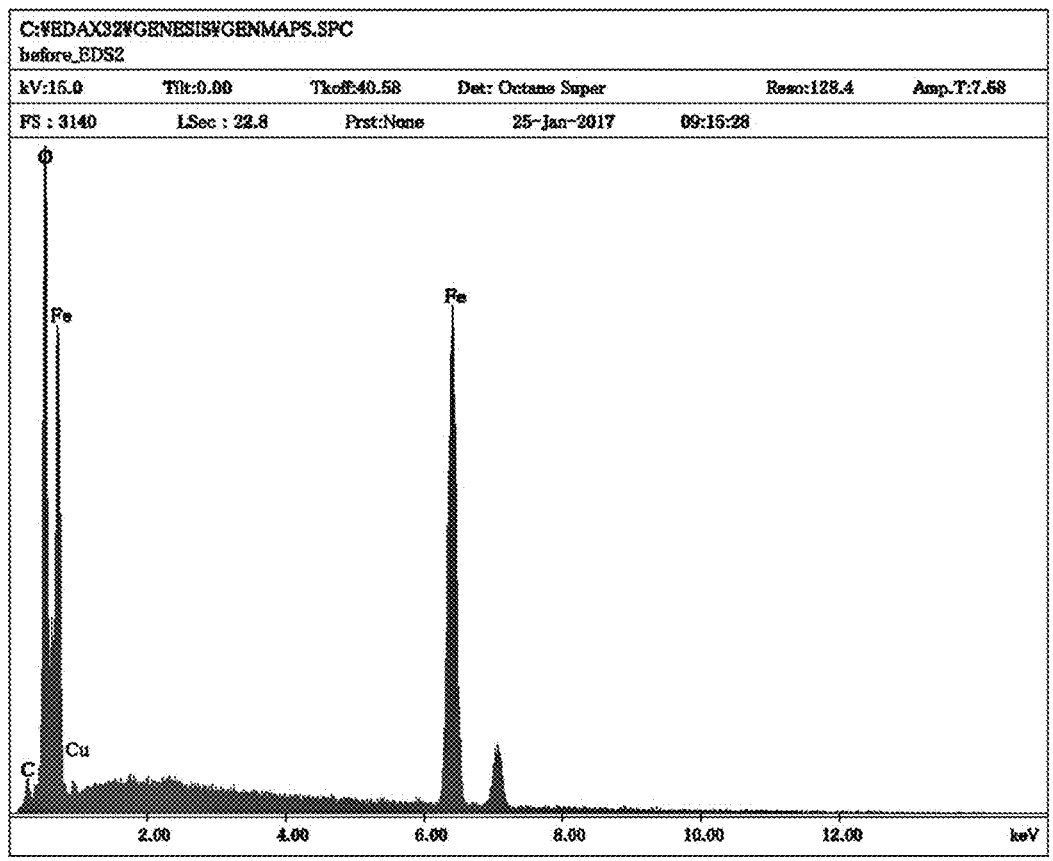

US 11,504,809 B2

SINTERED PRODUCT AND LASER MARKING METHOD FOR SINTERED PRODUCT

TECHNICAL FIELD

The present invention relates to a sintered product obtained by sintering a powder compact, and a method of applying laser marking on the sintered product.

The present application claims priority to Japanese Patent Application No. 2017-139182 filed on Jul. 18, 2017, the entire contents of which are incorporated by reference herein.

BACKGROUND ART

A sintered compact (sintered alloy) obtained by sintering a green compact of metal powder such as iron powder is used as an automotive component or a mechanical component. A product formed of such sintered alloy (hereinafter simply referred to as "the sintered product") includes, for example, a sprocket, a rotor, a gear, a ring, a flange, a pulley, a vane, a bearing and the like.

In general, a sintered product is manufactured by; subjecting raw material powder containing metal powder to press-molding to produce a powder compact; and sintering the powder compact. After the sintering, any finishing work is performed as necessary.

Patent Literature 1 discloses a marking method for a powder calcined product including: injection molding a mixture of metal powder or ceramic powder and an organic binder; applying laser marking on the green compact; debinding the green compact; and sintering the green compact.

According to the marking method disclosed in Patent Literature 1, laser marking is applied on the green compact or the subsequent debinded article. This is advantageous in capable of marking the article at fast speeds and with small-power laser light, and in improved manageability of an intermediate product.

CITATION LIST

Patent Literature

Patent Literature 1: Japanese Unexamined Patent Publication No. 5-185714

SUMMARY OF INVENTION (1) A method according to one aspect of the present invention is a laser marking method for a powder compact containing metal powder, including: a first step of scanning with laser light of first power which is weaker over a predetermined area in a surface of the powder compact, to melt and smooth inside of the predetermined area; and a second step of scanning with laser light of second power which is greater, to form a dot formed of a recess of a predetermined depth at a predetermined location in the predetermined area.

(8) A sintered product according to one aspect of the present invention is a sintered product obtained by sintering a powder compact containing metal powder, including: a two-dimensional code including a plurality of dots marked by laser marking on a surface of the powder compact. An oxygen content at a surface of the sintered product near the dots is 2 weight percent or less.

BRIEF DESCRIPTION OF DRAWINGS

FIG. 5 is a table showing suitable parameters of laser light in executing the marking process (a first to third steps).

FIG. 11 is a magnification of a dotted portion (the second step portion) remaining on a sintered product without the sizing.

FIG. 12 a magnification of a non-dotted portion (the third step portion) remaining on a sintered product without the sizing.

FIG. 13 is a magnification of an unprocessed portion (outside the first step area) of a sintered product without the sizing.

FIG. 15 is a magnification of a dotted portion (the second step portion) remaining on a sintered product with the sizing.

FIG. 16 is a magnification of a non-dotted portion (the third step portion) remaining on a sintered product with the sizing.

FIG. 17 is a magnification of an unprocessed portion (outside the first step area) of a sintered product with the sizing.

FIG. 18 shows EDS analysis result of a dotted portion of a sintered compact having undergone marking and thereafter a sintering process.

FIG. 19 shows EDS analysis result of a dotted portion of a sintered compact having undergone marking and thereafter a sintering process.

FIG. 20 shows EDS analysis result of a region of a sintered compact excluding the marking-target portion.

FIG. 21 shows EDS analysis result of a region of a sintered compact excluding the marking-target portion.

FIG. 22 shows EDS analysis result of a dotted portion of a sintered compact having undergone sintering and thereafter marking.

FIG. 23 shows EDS analysis result of a dotted portion of a sintered compact having undergone sintering and thereafter marking.

DESCRIPTION OF EMBODIMENT

Technical Problem

Figure 1:
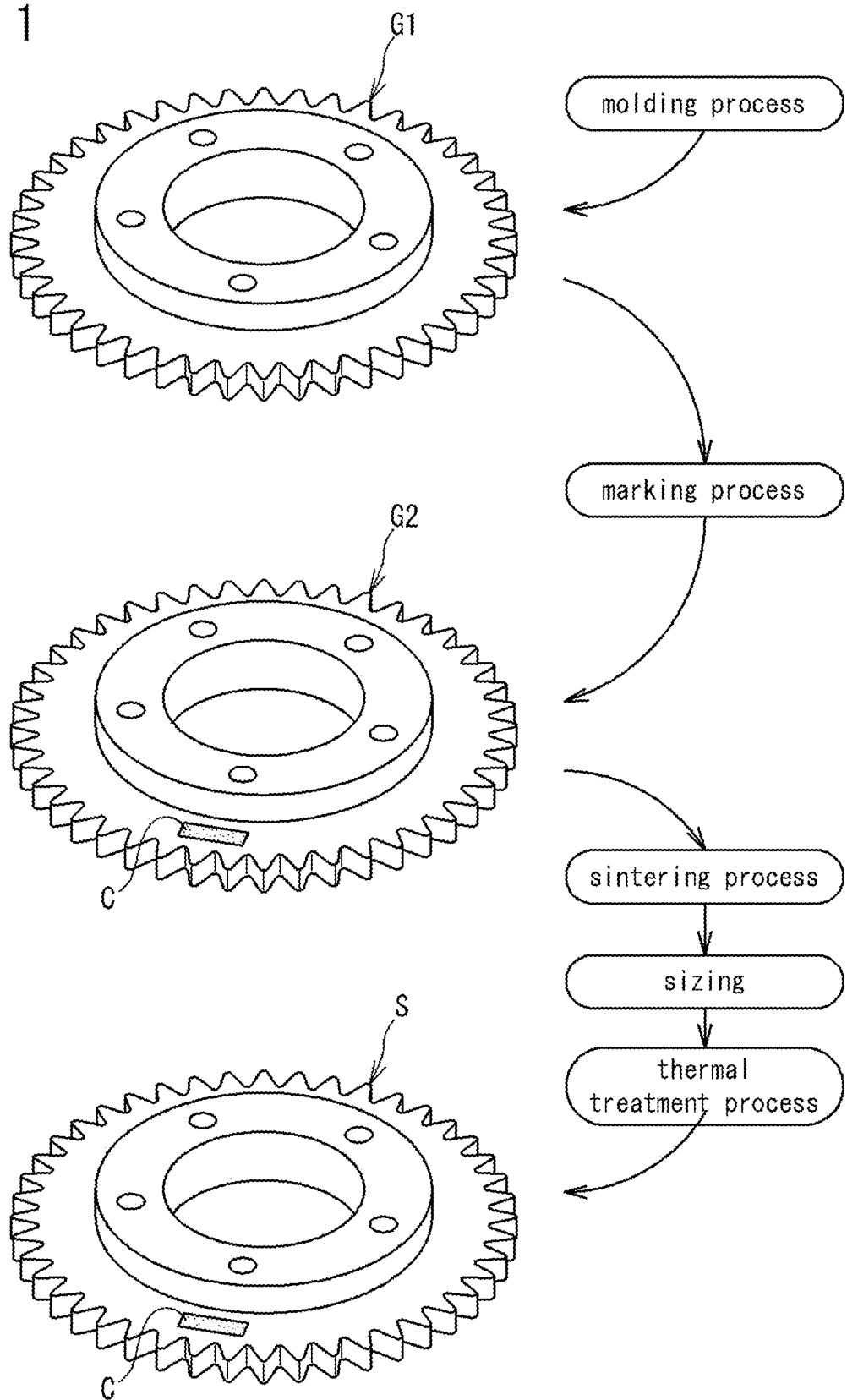
FIG. 1 is a perspective view of a powder compact and a sintered product according to an embodiment of the present invention.

In a green compact containing metal powder, the average particle size of the raw material powder falls within a range of about 20 μm to 200 μm inclusive. Accordingly, in the aggregation of the metal powder, there may exist relatively great voids. When such a void is substantially as great as a dot, it may cause a read error of a code reader. Patent Literature 1 does not address this problem.

In view of the foregoing conventional problem, an object of the present disclosure is to provide, in marking a predetermined identification display on a powder compact, a laser marking method of forming dots which minimize a read error of a code reader.

Advantageous Effects of Invention

The present disclosure realizes forming dots, in marking a predetermined identification display on a powder compact, which are surely readable after a sintering process of over 1000° C.

Solution to Problem

In the following, the overview of the embodiment of the present invention is summarized.

(1) A method according to the present embodiment is a laser marking method for a powder compact containing metal powder, including: a first step of scanning with laser light of first power which is weaker over a predetermined area in a surface of the powder compact, to melt and smooth inside of the predetermined area; and a second step of scanning with laser light of second power which is greater, to form a dot formed of a recess of a predetermined depth at a predetermined location in the predetermined area.

The laser marking method according to the present embodiment includes the first step and the second step. Therefore, after voids that may exist in the predetermined area have shrunk by the first step, the dot is formed in the predetermined area by the second step.

Thus, the dot which minimizes a read error of the code reader is formed in the predetermined area in the surface of the powder compact.

(2) In the laser marking method according to the present embodiment, the second step preferably includes a step of performing, for a plurality of times, rotary irradiation of rotationally irradiating inside a cell in the predetermined area with the laser light spirally from outside to inside.

The reason thereof is as follows. The rotary irradiation performed for a plurality of times allows lightness and darkness to be distinguished from each other by the difference in light reflectivity by the recess of the substantially circular dot. Thus, the dot is still readable by the code reader after the calcination process on the powder compact.

(3) In the laser marking method according to the present embodiment, the first power preferably falls within a range of 10 W to 25 W inclusive, and the second power preferably falls within a range of 20 W to 50 W inclusive.

The reason thereof is as follows. The first power less than 10 W may fail to melt the powder material because of the weak power and therefore is not suitable for smoothing the surface. The first power greater than 25 W may blacken the powder material because of the great power. Such blackened powder is less distinguishable from the dot formed by the second step.

The second power less than 20 W may fail to form the dot of a desired depth because of the weak power. The second power greater than 50 W may form the dot which is greater than the cell range because of the great power.

(4) In the laser marking method according to the present embodiment, a scan speed of the laser light of the first power is preferably 1500 mm/s or more and 2700 mm/s or less, and a scan speed of the laser light of the second power is preferably 250 mm/s or more and 320 mm/s or less.

The reason thereof is as follows. When the scan speed of the laser light of the first power is less than 1500 mm/s, the laser light may blacken the powder material because of its slow speed. Such blackened powder material is less distinguishable from the dot formed by the second step. When the scan speed is greater than 2700 mm/s, the laser light may fail to melt the powder material because of its fast speed and not suitable for smoothing the surface.

When the scan speed of the laser light of the second power is less than 250 mm/s, the laser light may form the dot which is greater than the cell range because of its low speed. When the scan speed is greater than 320 mm/s, the laser light may fail to form the dot of a desired depth because of its fast speed.

(5) The laser marking method according to the present embodiment preferably further includes a third step of scanning with laser light of third power which is weaker than the second power over a portion excluding the dot formed by the second step in the predetermined area.

The reason thereof is as follows. The third step can remove spatter attached around the edge part of the dot which may become a factor of a read error of the code reader.

(6) In the laser marking method according to the present embodiment, the third power preferably falls within a range of 10 W to 25 W inclusive.

The reason thereof is as follows. The third power less than 10 W may fail to remove spatter around the dot because of the weak power. The third power greater than 25 W may blacken the portion other than the dot because of the great power. Such a blackened portion is less distinguishable from the dot formed by the second step.

(7) In the laser marking method according to the present embodiment, a scan speed of the laser light of the third power is preferably 1700 mm/s or more and 3000 mm/s or less.

The reason thereof is as follows. When the scan speed of the laser light of the third power is less than 1700 mm/s, the laser light may blacken the portion other than the dot because of its slow speed. Such a blackened portion is less distinguishable from the dot formed by the second step. When the scan speed is greater than 3000 mm/s, the laser light may fail to remove spatter around the dot because of its fast speed.

(8) As described above, in the laser marking method according to the present embodiment, the inside of the predetermined area in the surface of the powder compact melts by the first step. Accordingly, the surface of the powder compact formed by the first step is smaller in porosity than the normal surface which is not subjected to the first step. In the second step, the rotary irradiation is performed for a plurality of times. The dot formed by the second step is formed of a tapered recess whose bottom is rounded, the dot including an opening portion whose plane shape is substantially circular.

(9) A sintered product according to the present embodiment is a sintered product obtained by sintering a powder compact containing metal powder, including a two-dimensional code including a plurality of dots marked by laser marking on a surface of the powder compact. An oxygen content at a surface of the sintered product near the dots is 2 weight percent or less.

As can be seen from the analysis result (FIGS. 18 to 23), in the two-dimensional code marked on the powder compact before sintering, the metal component oxidized by heating with the laser light is reduced in the sintering process. Thus, the oxygen content thereof is not largely different from that of the portion other than the marking-target portion (2 weight percent or less).

Therefore, in the sintered product having undergone the laser marking method according to the present embodiment, the oxygen content around the dots on the surface of the sintered product becomes 2 weight percent or less.

Details of Embodiment of the Present Invention

In the following, with reference to the drawings, a description will be given of specific examples of a sintered product, a method of manufacturing the sintered product, and a laser marking method of the present embodiment.

[Method of Manufacturing Sintered Product]

FIG. 1 is a perspective view of a powder compact G1, G2 and a sintered product S according to the present embodiment.

As shown in FIG. 1, the method of manufacturing the sintered product S according to the present embodiment at least includes: a "molding process" of fabricating the powder compact G1; a "marking process" of marking a predetermined identification display on the fabricated powder compact G1; a "sintering process" performed on the marked powder compact G2; and "sizing" and a "thermal treatment process".

One characteristic of the method of manufacturing the sintered product S according to the present embodiment is previously marking a predetermined identification display (for example, a two-dimensional code C) on the powder compact G1 before being sintered. In the following, with reference to FIG. 1, a description will be given of the contents of the manufacturing processes.

Note that, in the present embodiment, the reference character G1 is used for a powder compact before being marked, and the reference character G2 is used for a powder compact after being marked and before being sintered.

(Molding Process)

The molding process is a process of fabricating the powder compact G1 (the uppermost in FIG. 1) by subjecting raw material powder containing metal powder to press molding.

The powder compact G1 is an intermediate material to be the sintered product S (the lowermost in FIG. 1), and formed to have a shape corresponding to the sintered product S. FIG. 1 shows, as an example of the sintered product S, a sprocket for a silent chain which is one type of automotive components. Here, the present invention is applicable to any product other than the sprocket. The powder compact G1 has a surface portion where an identification display can be marked.

Raw Material Powder

The raw material powder of powder compact G1 mainly contains metal powder. The material of the metal powder can be arbitrarily selected according to the material of the sintered product S. The representative material may be an iron-based material.

The iron-based material refers to iron or iron alloy whose main component is iron. The iron alloy may be, for example, alloy containing at least one type of additive element selected from a group consisting of Ni, Cu, Cr, Mo, Mn, C, Si, Al, P, B, N, and Co.

Specific iron alloy may be stainless steel, Fe—C-based alloy, Fe—Cu—Ni—Mo-based alloy, Fe—Ni—Mo—Mn-based alloy, Fe—P-based alloy, Fe—Cu-based alloy, Fe—Cu—C-based alloy, Fe—Cu—Mo-based alloy, Fe—Ni—Mo—Cu—C-based alloy, Fe—Ni—Cu-based alloy, Fe—Ni—Mo—C-based alloy, Fe—Ni—Cr-based alloy, Fe—Ni—Mo—Cr-based alloy, Fe—Cr-based alloy, Fe—Mo—Cr-based alloy, Fe—Cr—C-based alloy, Fe—Ni—C-based alloy, Fe—Mo—Mn—Cr—C-based alloy or the like.

Employing the iron-based material powder as the main component, the iron-based sintered product S is obtained. When the iron-based material powder is employed as the main component, to the raw material powder of 100 mass percent, the content of the powder may be 90 mass percent or more, or 95 mass percent or more, for example.

When iron-based material powder, particularly iron powder, is employed as the main component, preferably metal powder of Cu, Ni, or Mo may be added as the alloy component.

Cu, Ni, Mo are elements which improve hardening. The content of Cu, Ni, or Mo may be, to the raw material powder of 100 mass percent, more than 0 mass percent and 5 mass percent or less, or may fall within a range of 0.1 mass percent to 2 mass percent inclusive, for example.

Note that, while the raw material powder is mainly the above-described metal powder, the raw material powder is permitted to inevitably contain a trace amount of impurities.

When the raw material powder is mainly iron-based material powder, particularly iron powder, a non-metal inorganic material such as carbon (graphite) powder may be added. C is an element which improves the strength of the sintered compact or any other thermal treatment-target object.

The content of C may be, to the raw material powder of 100 mass percent, more than 0 mass percent and 2 mass percent or less, or may fall within a range of 0.1 mass percent to 1 mass percent inclusive, for example.

The raw material powder preferably contains a lubricant. By virtue of containing a lubricant, lubricity and moldability improve in press molding the powder compact G1. This facilitates fabrication of a closely packed powder compact G1 with a lower pressure in the press molding. Such a closely packed powder compact G1 facilitates fabrication of a dense sintered product S.

The lubricant may be, for example, a metallic soap such as zinc stearate or lithium stearate, fatty acid amide such as stearamide, or higher fatty acid amide such as ethylene bis stearamide.

The lubricant may be in any phase such as solid, powder, or liquid. The content of the lubricant may be, to the raw material powder of 100 mass percent, 2 mass percent or less, or 1 mass percent or less, for example. When the content of the lubricant is 2 mass percent or less, the rate of the metal powder contained in the powder compact G can be increased.

This facilitates fabrication of a closely packed powder compact G with a lower pressure in the press molding. Additionally, this minimizes volume shrinkage due to loss of the lubricant in sintering the powder compact G2 which follows the press molding. This facilitates fabrication of a dense sintered product S at high dimension precision.

The content of the lubricant is preferably 0.1 mass percent or more, or 0.5 mass percent or more in view of improving the effect of the lubricity.

While the raw material powder may contain an organic binder, the raw material powder of the powder compact G1 according to the present embodiment preferably does not contain an organic binder.

By virtue of the raw material powder not containing an organic binder, the rate of the metal powder contained in the powder compact G1 can be increased. This facilitates fabrication of a closely packed powder compact G with a lower pressure in the press molding. Additionally, this dispenses with the necessity of degreasing the powder compact G in a later process.

The metal powder may be water atomized powder, reduced powder, or gas atomized powder. Among others, water atomized powder or reduced powder is suitable.

The reason is as follows. Water atomized powder or reduced powder is provided with numerous projections and recesses at their particle surface. In molding, these projections and recesses of the particles mesh with each other, which improves shape retainability of the powder compact G1. In general, particles with a smaller number projections and recesses at the surface tend to be obtained with gas atomized powder, whereas particles with a greater number of projections and recesses at the surface tend to be obtained with water atomized powder or reduced powder.

The average particle size of the metal powder may fall within a range of, for example, 20 μm to 200 μm inclusive. The average particle size may fall within a range of 50 μm to 170 μm inclusive, or a range of 80 μm to 140 μm inclusive.

The average particle size of the metal powder refers to the particle size (D50) by which the cumulative volume in volume-based particle size distribution measured by a laser diffraction particle size analyzer becomes 50%. When the average particle size of the metal powder falls within this range, handleability of the powder improves and the press molding is facilitated.

Press Molding

In the press molding in the molding process, a molding device (a molding die) capable of molding a shape corresponding to the sintered product S which is the final product is employed. The powder compact G1 (a sprocket) exemplarily shown in FIG. 1 is wholly integrally molded in the molding.

The molding device (not shown) includes, for example, upper and lower punches, an inner die inserted into the upper and lower punches to form the inner circumferential surface of the boss part of the powder compact G1, and an outer die surrounding the outer circumference of the upper and lower punches and provided with a through hole for forming the gear portion of the powder compact G1.

The axially opposite end surfaces of the powder compact G1 are the surfaces pressed by the upper and lower punches. The inner circumferential surface and the outer circumferential surface of the powder compact G1 are sliding surfaces of the inner and outer dies. The pressing pressure of the press-molding in the molding process may fall within a range of, for example, 250 MPa to 800 MPa inclusive.

(Marking Process)

The marking process is a process of marking a predetermined identification display on the powder compact G1. The marking is, for example, performed using a laser marker. The predetermined identification display may be a two-dimensional code (a data matrix) or a QR code ("QR code" is a registered trademark).

In the present embodiment, the identification display is a two-dimensional code C in view of minimizing the area of the identification display per product.

The two-dimensional code C records predetermined identification information (hereinafter referred to as "the product ID") capable of uniquely identifying one sintered product S and defining the sintered product S immediately after the press-molding.

The product ID is information including, for example, a molding time in the molding process, a molding time point (year, month, and day, and hour, minute, second in the day), a code number of any drawings, a code number of a press-molding machine used in the molding process, and a code number of a factory. The powder compact G1 undergoes press-molding one by one for each time point. Therefore, the molding time point of the product ID forms the serial number of the sintered product S.

(Sintering Process)

The sintering process is a process of sintering the powder compact G1 having undergone the marking. The powder compact G1 undergoing the sintering process provides an intermediate material (hereinafter referred to as "the sintered compact") on which the two-dimensional code C which has been marked before sintering remains.

In the sintering process, a sintering furnace (not shown) capable of exerting temperature and atmosphere control is used. The sintering condition should be set as appropriate according to the material of the powder compact G2 and the like.

The sintering temperature is set to be equal to or lower than the melting point of the main metal powder (for example, 1400° C. or lower), and preferably 1000° C. or higher, for example. The sintering temperature may be 1100° C. or higher or 1200° C. or higher.

The sintering time may fall within a range of, for example, 15 minutes to 150 minutes inclusive, or 20 minutes to 60 minutes inclusive.

(Sizing)

The sizing is a process of again compressing the intermediate material (the sintered compact) which is obtained by sintering the powder compact G2, to improve the dimension precision of the sintered compact. The two-dimensional code C still remains on the sintered compact after the sizing.

The press-molding machine used in the sizing is, for example, a turn-table press-molding machine which includes a lower die on which a sintered compact is set by a robot arm, and an upper die configured to press the set sintered compact from above.

The pressing pressure of the press-molding in the sizing may fall within a range of 250 MPa to 800 MPa inclusive, for example, while it depends on the type of the sintered product S.

(Thermal Treatment Process)

The thermal treatment process is a process of hardening the surface of the sintered compact by subjecting the sintered compact having undergone the sizing to a predetermined thermal treatment. The sintered compact having undergone sizing undergoing the thermal treatment process provides the sintered product S on which the two-dimensional code C remains.

The thermal treatment apparatus used in the thermal treatment process may be any of the series type and the batch type. The batch type thermal treatment apparatus at least includes a hardening furnace for subjecting the sintered compact to carburizing and hardening, and a tempering furnace for tempering the hardened sintered compact. The carburizing scheme of the thermal treatment apparatus may be any of gas carburizing, vacuum carburizing, and ion carburizing.

Note that, the manufacturing process of the sintered product S shown in FIG. 1 may further include: a process of providing predetermined cutting or boring on the sintered compact having undergone the sizing before the thermal treatment; a process of providing surface treatment on the sintered product S having undergone the thermal treatment.

In the manufacturing method according to the present embodiment, the two-dimensional code C is marked on the powder compact G1 before sintering. Hence, with the two-dimensional code C which is still readable after the sintering process, the sizing, and the thermal treatment process is marked, in conjunction with the code readers configured to read the product ID from a picked up image disposed along the manufacturing line, it becomes possible to monitor every product for its location and time point.

This makes it possible to manage the manufacture history data such as "the sintering temperature chart" in the sintering process, "the pressing pressure" and "the upper ram bottom dead center" in the sizing, and "the thermal treatment atmosphere chart" in the thermal treatment process per product.

[Problems and Solution in Marking on Powder Compact]

Meanwhile, the raw material powder of the powder compact G1 contains metal powder whose average particle size falls within a range of about 20 μm to 200 μm inclusive. Accordingly, on the surface of the powder compact G1 where metal powder particles are aggregated, there exist locations where relatively great voids (about 150 μm to 200 μm at maximum) exist. These voids are factors of a read error of the code reader.

In order to prevent an increase in the manufacturing time, the marking process must be performed fast. In order to prevent any influence on the product strength that may be caused by the marking the two-dimensional code C, the marking must be performed at lower energy to the narrowest possible region.

Figure 2:
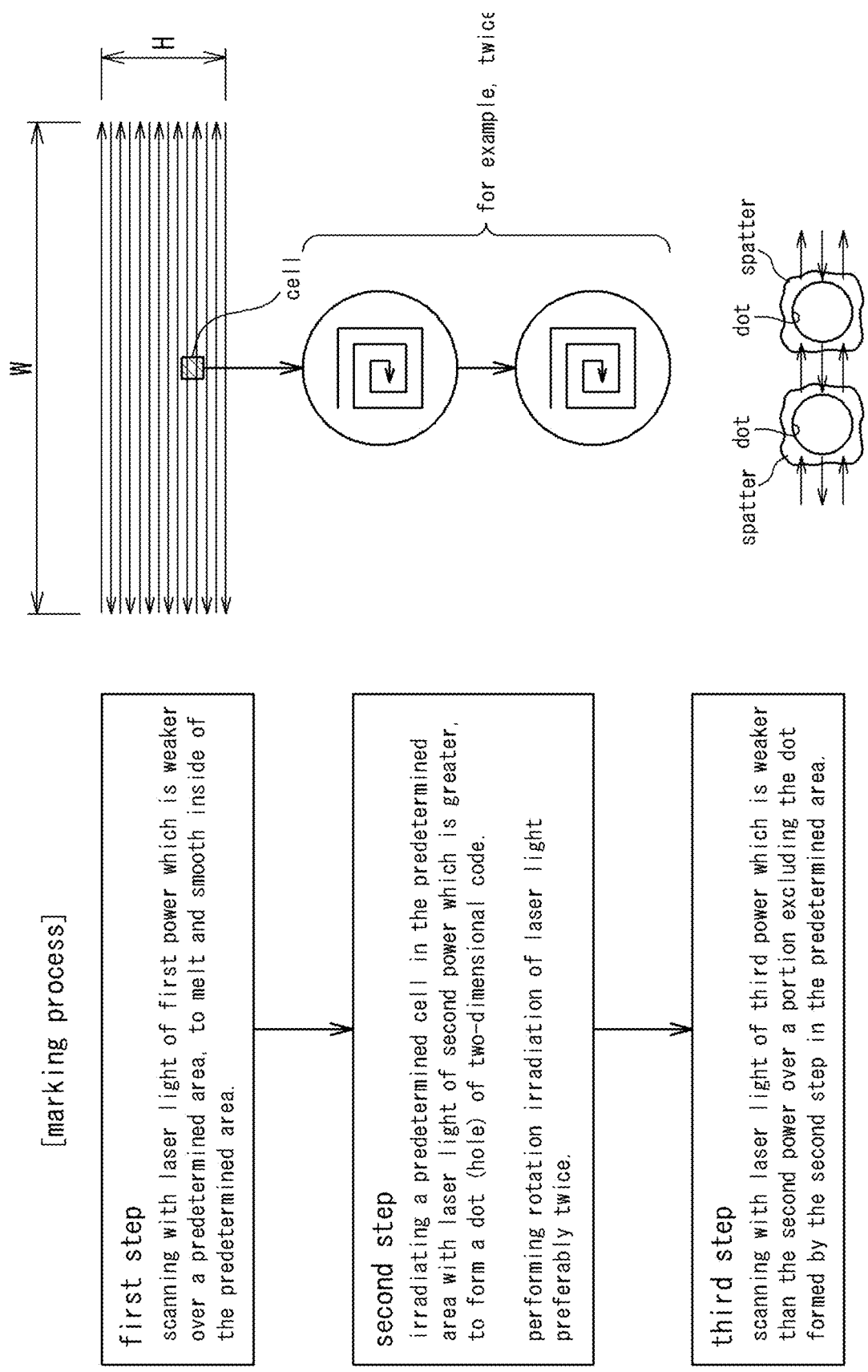
FIG. 2 is an explanatory illustration of steps included in a marking process.

FIG. 2 is an explanatory illustration describing the steps included in the marking process according to the present embodiment.

The inventors of the present invention have conducted marking on the powder compact G1 before being sintered by various methods. As a result, the inventors have found that the marking method including first to third steps shown in FIG. 2 is effective in marking the two-dimensional code C on the powder compact G1 before being sintered. In the following, with reference to FIG. 2, a detailed description will be given of the marking process according to the present embodiment.

(First Step)

The first step is the step of scanning with first-power laser light of weaker power over a predetermined area (the area defined by the width W and the height H in FIG. 2) in the surface of the powder compact G1, to melt and smooth the inside of the predetermined area of the powder compact G1.

While the numerical value range of the width W and the height H vary depending on the number of cells included in the two-dimensional code C, the numerical value range may preferably be, for example, 8 mm≤W≤11 mm and 2.5 mm≤H≤3.5 mm.

The preferable numerical value range of the laser light in the first step is as follows. For example, the power of the laser light in the first step (the first power) preferably falls within a range of 10 W to 25 W inclusive.

When the power is less than 10 W, the laser light may fail to melt the powder material because of its weak power and therefore is not suitable for smoothing the surface. When the power is greater than 25 W, the laser light may blacken the powder material because of its great power. Such blackened powder is less distinguishable from dots formed by the second step.

The scan speed (scan speed) of the laser light in the first step is preferably 1500 mm/s or more and 2700 mm/s or less.

When the speed is less than 1500 mm/s, the laser light may blacken the powder material because of its slow speed. Such blackened powder is less distinguishable from dots formed by the second step. When the speed is greater than 2700 mm/s, the laser light may fail to melt the powder material because of its fast speed and therefore is not suitable for smoothing the surface.

The first step is effective for the following reasons. That is, the code reader for the two-dimensional code C identifies the code by the contrast between the white ground and the black dots. Accordingly, in the present embodiment, in order to facilitate the recognition of the two-dimensional code C, the groundwork processing as in the first step is performed.

In relation to manufacturing a metal product containing iron alloy, the surface of the material is slightly dark. Therefore, performing the first step as the groundwork processing slightly brightens the surface. Thus, the whiteness is enhanced.

In the first step, not just the laser power is weaker than in the normal mode, preferably the scan speed of laser light is faster than in the normal mode as described above. When the scan speed is slow, the raw material powder is burned and blackened. Here, a faster scan speed than in the normal mode can smooth the ground without coloring the raw material powder.

In this manner, the first step is performed to fill up a predetermined area of the powder compact C by drawing a stripe pattern inside the predetermined area at a high scan speed.

In the first step, filling up finely the predetermined area with narrow-width laser light, the inside of the predetermined area is more evenly and smoothly finished. On the other hand, there is a limit in narrowing the laser light width and an excessively narrow width increases the scan time. Therefore, the line width or the number of streaks should be set according to the intended use.

For example, in the present embodiment, in order to reduce the scan time, one cell is filled with the width of three streaks of laser light.

(Second Step)

The second step is a step of irradiating a predetermined cell in the predetermined area smoothed by the first step with second-power laser light of higher power, to form dots (holes) of the two-dimensional code C in the predetermined cell. Preferably, the second step is performed immediately successively preceding the thermal diffusion effected by the first step.

Specifically, by irradiating inside the cell with laser light in a rotating manner from the outside toward the inside, a sharp deep hole is bored in the cell. In this case, the rotary irradiation with the laser light is preferably performed twice. Furthermore, preferably, the second step is performed immediately successively preceding the thermal diffusion effected by the first step.

In the second step, the size of the cell which is the read unit by the code reader is, for example, a square whose sides each measure 150 μm to 270 μm.

In the example of FIG. 2, while the track of the rotary irradiation directed from the outer side toward the inner side in the cell is substantially quadrangular spiral, the track of the rotary irradiation may be other polygonal spiral, or circular spiral. The number of times of performing the rotary irradiation in the second step is not specified to twice, and may be once or three or more times.

The diameter of each dot formed in the cell by the rotary irradiation is not particularly specified, so long as it is the dimension readable by the code reader and not greater than the cell and not adversely affecting the adjacent dot.

Specifically, the diameter of the opening portion of the dot preferably falls within a range of 50 µm to 140 µm inclusive. The size less than 50 µm is not preferable because it is too small and hardly recognized by the normal code reader to be read as a dark part. The size greater than 140 µm is not preferable because it causes a re-deposited object or a re-attached object occurring at the outer peripheral edge of the dot-like recess in the second step to also deposit or attach to the inside of the adjacent recess, which is disadvantageous in forming dots. The diameter of the dot may fall within a range of 60 µm to 130 µm inclusive, or 70 µm to 120 µm inclusive.

The depth of the dot formed in the cell by the rotary irradiation is preferably as deep as possible, in order for the recess which forms the dot to be fully distinguishable.

Specifically, the depth of the dot preferably falls within a range of 70 µm to 200 µm inclusive. The depth of the dot may fall within a range of 90 µm to 180 µm inclusive, or 110 µm to 170 µm inclusive.

The preferable numerical value range of laser light in the second step is as follows. For example, the laser light power in the second step (the second power) preferably falls within a range of 20 W to 50 W inclusive.

When the power is less than 20 W, the laser light may fail to form the dot of a desired depth because of its weak power. When the power is greater than 50 W, the laser light may form the dot which is greater than the cell range because of its great power.

The scan speed (scan speed) of the laser light in the second step is preferably 250 mm/s or more and 320 mm/s or less.

When the speed is less than 250 mm/s, the laser light may form the dot which is greater than the cell range because of its low speed. When the speed is greater than 320 mm/s, the laser light may fail to form the dot of a desired depth because of its fast speed.

(Third Step)

The third step is a step of scanning, with laser light of the third power which is weaker than the second power, the portion other than the dots formed by the second step in the predetermined area. The third step is preferably performed immediately successively preceding the thermal diffusion effected by the second step.

The third step removes spatter attached around the edge part of the dot which may become a factor of a read error of the code reader.

The preferable numerical value range of the laser light in the third step is as follows. For example, the laser light power (the third power) in the third step preferably falls within a range of 10 W to 25 W inclusive.

When the power is less than 10 W, the laser light may fail to remove spatter around the dots because of its weak power. When the power is greater than 25 W, the laser light may blacken the portion other than the dots because of its great power. Such a blackened portion is less distinguishable from the dots formed by the second step.

The scan speed (scan speed) of the laser light in the third step is preferably 1700 mm/s or more and 3000 mm/s or less.

When the speed is less than 1700 mm/s, the laser light may blacken the portion other than the dots because of its slow speed. Such a blackened portion is less distinguishable from the dots formed by the second step. When the speed is greater than 3000 mm/s, the laser light may fail to remove spatter around the dots because of its fast speed.

[Laser Light used in Each Step]

In the laser marking method according to the present embodiment, the suitable numerical value range in connection with the laser light used in the first to third steps is summarized as follows.

In the following, the laser light used in the first step is referred to as "the first laser light"; the laser light used in the second step is referred to as "the second laser light"; and the laser light used in the third step is referred to as "the third laser light".

(Irradiation Energy per Unit Area)

The irradiation energy per unit area of the first laser light preferably falls within a range of 0.05 $J/mm^2$ to 0.50 $J/mm^2$ inclusive.

The irradiation energy per unit area of the second laser light preferably falls within a range of 1.0 $J/mm^2$ to 7.0 $J/mm^2$ inclusive.

The irradiation energy per unit area of the third laser light preferably falls within a range of 0.05 $J/mm^2$ to 0.50 $J/mm^2$ inclusive.

The irradiation energy per unit area of the laser light (unit: $J/mm^2$, hereinafter the term "unit" is omitted) is defined by the average power per unit spot (W) of the laser light multiplied by the irradiation time of scanning a unit area (s/$mm^2$: hereinafter referred to as "the irradiation time per unit area").

The average power per unit spot is defined as energy per unit time with the CW laser, and as pulse energy (J) multiplied by repetition frequency (1/s) with the pulsed laser.

When the irradiation energy per unit area of the first laser light is less than 0.05 $J/mm^2$, the first laser light may fail to melt the powder material and therefore is not suitable for smoothing the surface. More preferably, the irradiation energy per unit area is 0.10 $J/mm^2$ or more.

When the irradiation energy per unit area of the first laser light is greater than 0.50 $J/mm^2$, the first laser light may blacken the powder material. Such a blackened portion is less distinguishable from the dot-like recesses formed by the second laser light and therefore such power is not preferable. More preferably, the irradiation energy per unit area is 0.30 $J/mm^2$ or less.

When the irradiation energy per unit area of the second laser light is less than 1.0 $J/mm^2$, the second laser light may fail to form the dot-like recesses of a desired depth and therefore such power is not preferable. More preferably, the irradiation energy per unit area is 2.0 $J/mm^2$ or greater.

When the irradiation energy per unit area of the second laser light is greater than 7.0 $J/mm^2$, it invites an excessive increase in vaporized objects or scattered objects, significantly increasing the re-deposited objects or re-attached objects which may fail to be fully removed by the later third laser light. Therefore, such power is not preferable. More preferably, the irradiation energy per unit area is 5.0 $J/mm^2$ or less.

When the irradiation energy per unit area of the third laser light is less than 0.05 $J/mm^2$, the third laser light may fail to fully remove the re-deposited objects or re-attached objects deposited on the outer peripheral edge of the dot-like recesses, or may fail to fully planarize the surface. More preferably, the irradiation energy per unit area is 0.10 $J/mm^2$ or more.

When the irradiation energy per unit area of the third laser light is greater than 0.50 $J/mm^2$, the third laser light may blacken the portion other than the dot-like recesses. That is, the portion to be a light part is darkened. Such a darkened portion is less distinguishable from the dot-like recesses formed by the second laser light and therefore is not preferable. More preferably, the irradiation energy per unit area is 0.30 J/mm² or less.

(Numerical Value Range of Average Power of Laser Light, Spot Diameter and Scan Speed)

As to the first laser light, the average power per unit spot preferably falls within a range of 10 W to 25 W inclusive; the spot diameter preferably falls within a range of 0.010 mm to 0.060 mm inclusive; and the scan speed preferably falls within a range of 1500 mm/s to 2700 mm/s inclusive.

As to the second laser light, the average power per unit spot preferably falls within a range of 20 W to 50 W inclusive; the spot diameter preferably falls within a range of 0.010 mm to 0.060 mm inclusive; and the scan speed preferably falls within a range of 250 mm/s to 320 mm/s inclusive.

As to the third laser light, the average power per unit spot preferably falls within a range of 10 W to 25 W inclusive; the spot diameter preferably falls within a range of 0.010 mm to 0.060 mm inclusive; and the scan speed preferably falls within a range of 1700 mm/s to 3000 mm/s inclusive.

Defining that the average power per unit spot of laser light is p, the spot diameter is r, the scan speed is v, the irradiation time per unit area is t, and the irradiation energy per unit area is e, the relationship of them is expressed as follows:

$$e = p \times t \qquad \text{(Expression 1)}$$

where $t = 1/(r \times v)$, hence $$e = p/(r \times v) \qquad \text{(Expression 2)}$$

From Expression 2, the range of the value of e is determined by the values of the p, r, and v. Therefore, the suitable range of the p, r, and v required in realizing the suitable range for e is defined.

(Numerical Value Range of Average Power p of each Laser Light)

When the average power p of the first laser light is less than 10 W, the first laser light may fail to melt the powder material because of its weak power and not suitable for planarizing the surface. Therefore, such average power p is not preferable. More preferably, the average power p is 13 W or more.

When the average power p of the first laser light is greater than 25 W, the first laser light may blacken the powder material because of its great power. Such a blackened material is less distinguishable from the dots formed by the second laser light and therefore is not preferable. More preferably, the average power p is 20 W or less.

When the average power per unit spot p of the second laser light is less than 20 W, the second laser light may fail to form the dot-like recesses of a desired depth because of its weak power and therefore is not preferable. More preferably, the average power per unit spot p is 30 W or greater.

When the average power per unit spot p of the second laser light is greater than 50 W, the second laser light invites an excessive increase in vaporized objects or scattered objects because of its great power, significantly increasing re-deposited objects or re-attached object which may fail to be fully removed by the later third laser light. Therefore, such power is not preferable. More preferably, the average power per unit spot p is 40 W or less.

When the average power p of the third laser light is less than 10 W, the third laser light may fail to remove re-deposited objects or re-attached objects on the outer peripheral edge of each dot-like recess because of its weak power and not suitable for planarizing the surface. Therefore, such average power p is not preferable. More preferably, the average power per unit spot p is 13 W or more.

When the average power p of the third laser light is greater than 25 W, the third laser light may darken a portion other than the dot-like recesses because of its great power. Such darkened portion is less distinguishable from the dots formed by the second laser light and therefore is not preferable. More preferably, the average power per unit spot p is 20 W or less.

(Numerical Value Range of Scan Speed v of Each Laser Light)

When the scan speed v of the first laser light is less than 1500 mm/s, the first laser light may blacken the powder material because of its slow speed. Such blackened powder material is less distinguishable from the dot-like recesses formed by the second laser light and therefore is not preferable. More preferably, the scan speed v is 1700 mm/s or more.

When the scan speed is greater than 2700 mm/s, the first laser light may fail to melt the powder material because of its fast speed and not suitable for smoothing the surface. Therefore, it is not preferable. More preferably, the scan speed is 2500 mm/s or less.

When the scan speed v of the second laser light is less than 250 mm/s, the second laser light may significantly increase vaporized objects or scattered objects because of its slow speed and therefore is not preferable. More preferably, the scan speed v is 270 mm/s or more.

When the scan speed v is greater than 320 mm/s, the second laser light may fail to form the dot-like recesses of a desired depth because of its fast speed and therefore is not preferable. More preferably, the scan speed v is 300 mm/s or less.

When the scan speed v of the third laser light is less than 1700 mm/s, the third laser light may darken a portion other than the dot-like recesses because of its slow speed. Such darkened portion is less distinguishable from the dot-like recesses formed by the second laser light and therefore is not preferable. More preferably, the scan speed v is 2000 mm/s or more.

When the scan speed is greater than 3000 mm/s or more, re-deposited objects or re-attached objects deposited on the outer peripheral edge of the dot-like recesses may fail to be fully removed because of its fast speed and therefore is not preferable. More preferably, the scan speed v is 2700 mm/s or less.

(Numerical Value Range of Spot Diameter r of Each Laser Light)

When the spot diameter r of the first laser light is less than 0.010 mm, the irradiation energy per unit area e becomes great and may blacken the powder material. Such blackened powder material is less distinguishable from the dot-like recesses formed by the second laser light and therefore is not preferable.

When the spot diameter r is greater than 0.060 mm, the irradiation energy per unit area e becomes small and may fail to melt the powder material. This is not suitable for smoothing the surface and therefore is not preferable.

When the spot diameter r of the second laser light is less than 0.010 mm, since the spot diameter r is small, the irradiation energy per unit area e becomes great as shown in Expression 2. This may significantly increase vaporized objects or scattered objects and therefore is not preferable.

When the spot diameter r is greater than 0.060 mm, the irradiation energy per unit area e becomes small and may fail to form the dot-like recesses of a desired depth and therefore is not preferable.

When the spot diameter r of the third laser light is less than 0.010 mm, the irradiation energy per unit area e becomes great and may blacken the surface portion other than the dot-like recesses. Such a blackened portion is less distinguishable from the dot-like recesses formed by the second laser light and therefore is not preferable.

When the spot diameter r is greater than 0.060 mm, the irradiation energy per unit area e becomes small and may fail to fully remove re-deposited objects or re-attached objects deposited on the outer peripheral edge of the dot-like recesses. Therefore, it is not preferable.

[Effectiveness of Rotary Irradiation]

Figure 3:
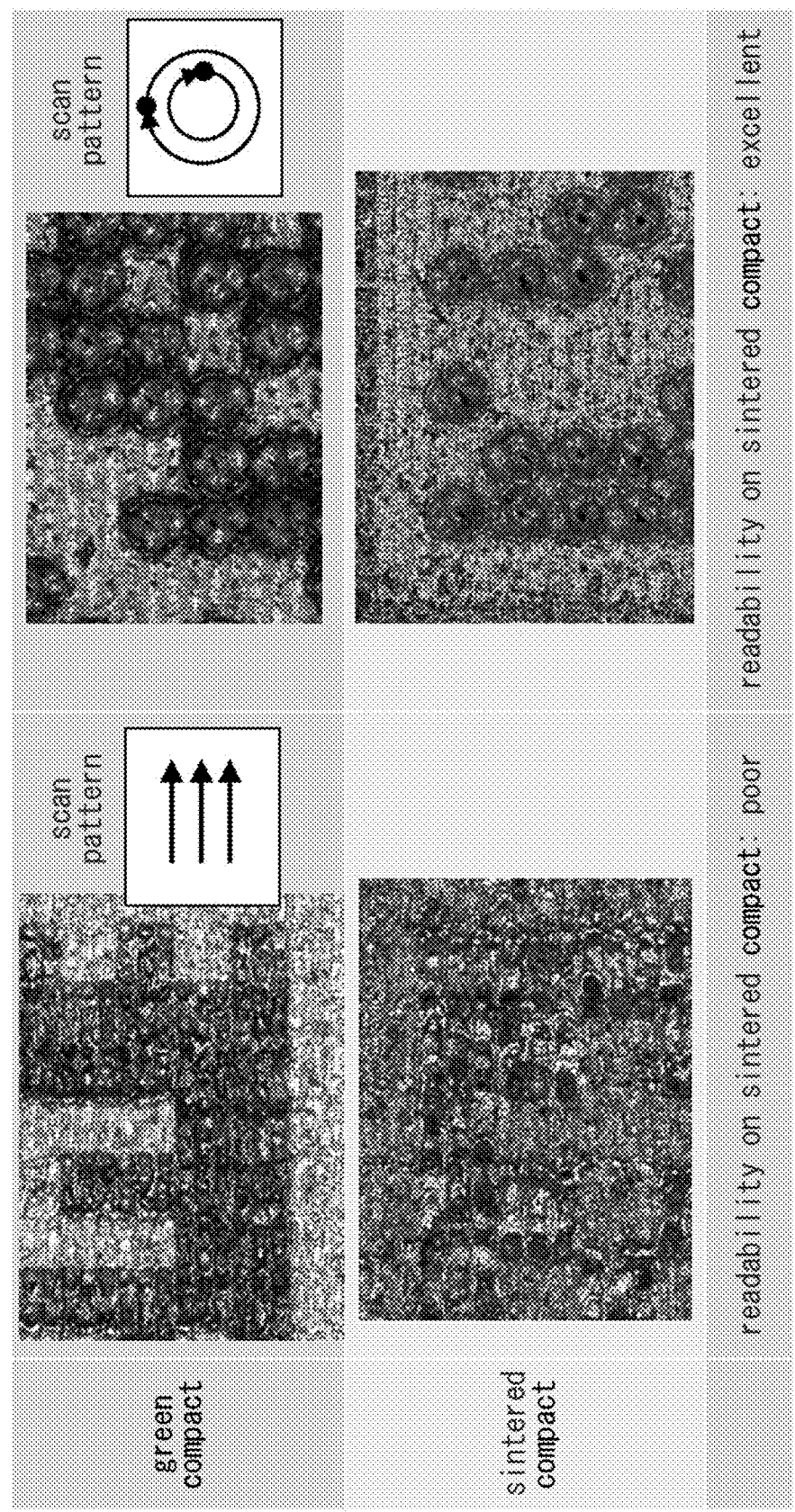
FIG. 3 is an explanatory illustration showing the influence of a scan pattern of laser light on readability of a two-dimensional code on a sintered compact.

FIG. 3 is an explanatory illustration showing the influence of the scan pattern of laser light on readability of a two-dimensional code C on a sintered compact.

The left column images in FIG. 3 show the surface of the green compact and the sintered compact obtained by forming substantially square dots in a parallel-shifting scan pattern on the powder compact G1 having undergone the first step. The right column images in FIG. 3 show the surface of the green compact and the sintered compact obtained by forming substantially circular dots in a rotary-irradiation (circular in the drawing) scan pattern on the powder compact G1 having undergone the first step.

As shown in the upper left image in FIG. 3, with the parallel-shifting scan pattern, the contrast between white attained in the first step and black which is the baked color is relatively clearly recognized at the stage of the green compact.

However, as shown in the lower left image in FIG. 3, with the parallel-shifting scan pattern, in the sintered compact obtained through the sintering process, the black baked color is reduced in the sintering process and the shape of the black dots are so disfigured that they cannot be read by the code reader.

On the other hand, as shown in the upper right image in FIG. 3, with the rotary-irradiation scan pattern also, the contrast between white attained in the first step and black which is the baked color is relatively clearly recognized at the stage of the green compact.

Furthermore, as shown in the lower right image in FIG. 3, with the rotary-irradiation scan pattern, lightness and darkness can still be distinguished from each other by the difference in light reflectivity at the recesses of the substantially circular dots with the sintered compact having undergone the sintering process. Thus, the two-dimensional code C is readable by the code reader.

As can be seen from the comparison result shown in FIG. 3, the scan pattern in forming dots of the two-dimensional code C is effective when it is the rotary irradiation, i.e., the inside of the cell is irradiated with the laser light from the outside toward the inside.

Such rotary irradiation can form relatively deep recesses which are still readable by the code reader after the sintering.

[Transition of Appearance of Two-Dimensional Code]

Figure 4:
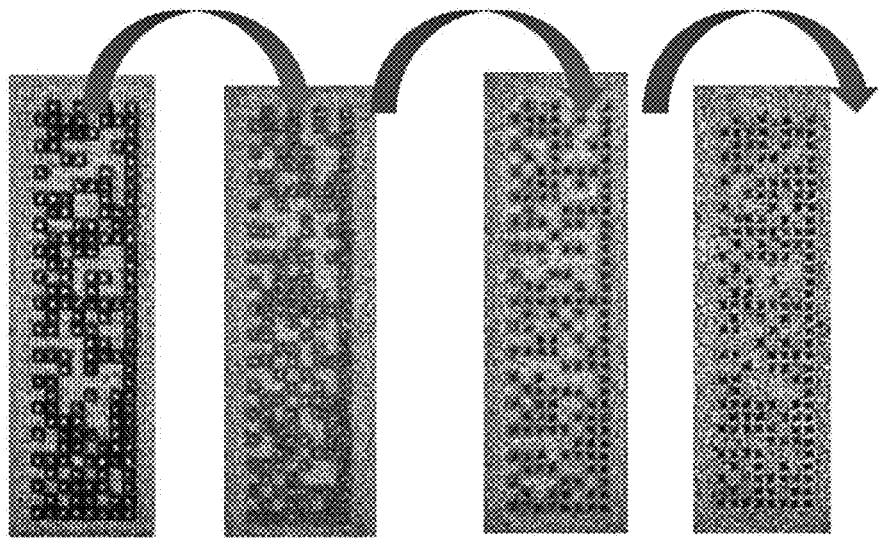
FIG. 4 is an explanatory illustration showing the transition of the appearance of the two-dimensional code.

FIG. 4 is an explanatory illustration showing the transition of the appearance of the two-dimensional code C.

As shown in FIG. 4, in the two-dimensional code C marked on the powder compact G1 through the marking process, the baked color of the dotted portion almost fades by a reduction reaction in the sintering process and the black tone reduces. However, the recesses of the dots remain. That is, after the sintering, dark parts (black color) formed by the recesses of the dots still remain enough to be read by the code reader.

Thereafter, by the surface of the sintered compact being crushed by the sizing, the area of the recesses of the dots reduces. Here, the depth of the dots remains unchanged. Accordingly, the dark parts (black color) formed by the recesses of the dots still remain enough to be read by the code reader after the sizing.

Furthermore, while the whole surface of the two-dimensional code C is colored in brown by the thermal treatment, the depth of the dots remains unchanged. Accordingly, the dark parts (black color) formed by the recesses of the dots still remain enough to be read by the code reader after the thermal treatment.

EXAMPLE

FIG. 5 is a table showing suitable parameters of laser light in executing the marking process (the first to third steps).

The parameters in FIG. 5 are specification data with MP-M500, which is FAYb laser marker available from Panasonic Corporation. Note that, the laser marker is not specified to MP-M500.

The inventors have set the parameters in FIG. 5 on the above-described laser marker, and conducted the marking process on the powder compact G1. Thereafter, the powder compact G1 has undergone the sintering process, and the sintered product S was obtained. Various observation and analysis were made on the sintered product S.

The composition of the metal powder of the powder compact G1 is Fe-2Cu-0.8C. In the following, the observation and analysis results are described.

[Observation Result with Scanning Electron Microscope]

FIGS. 6 to 9 are each a magnification of the two-dimensional code C and its dotted portion obtained by a scanning electron microscope (SEM).

Figure 6:
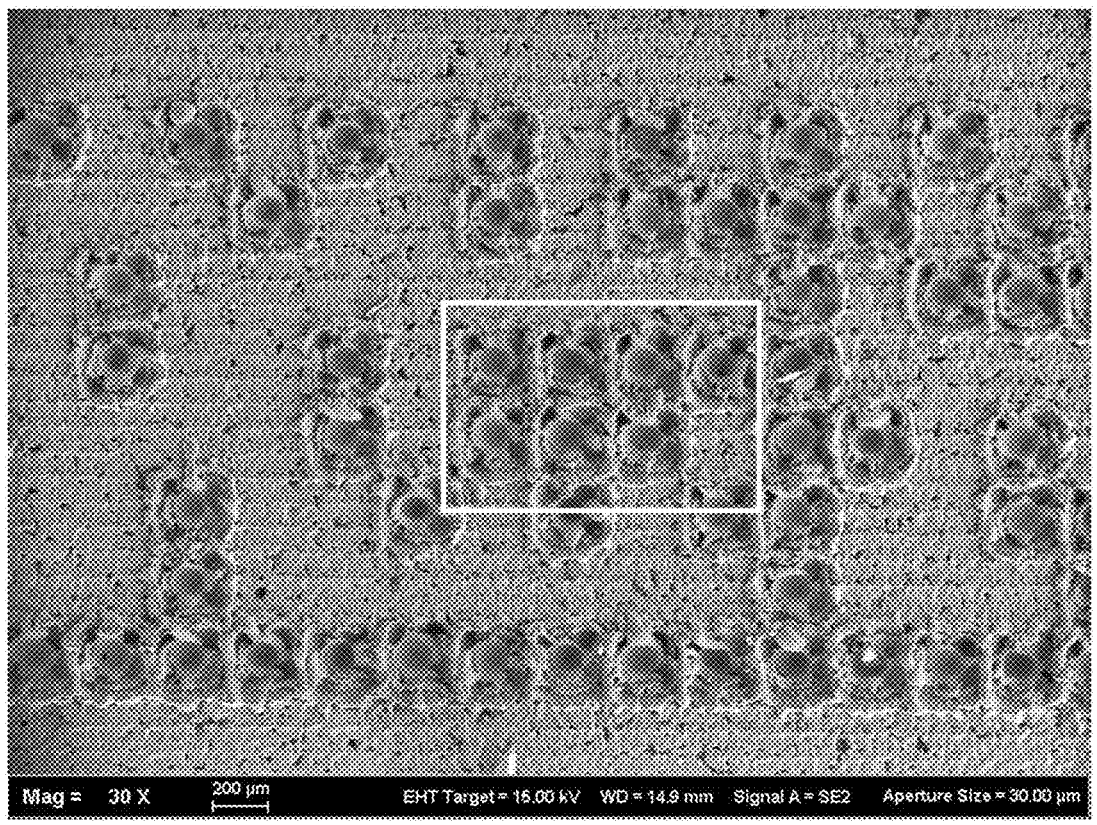
FIG. 6 is a magnification of part of the two-dimensional code remaining on the sintered product.
Figure 7:
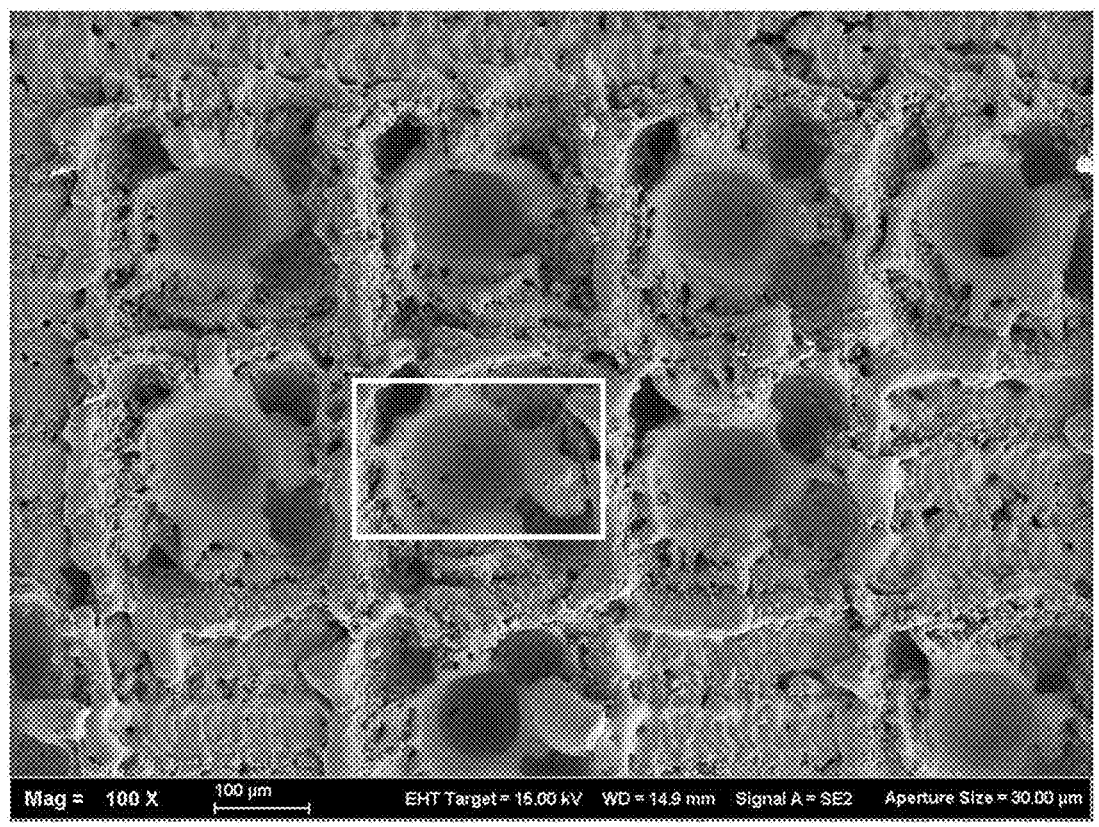
FIG. 7 is a magnification of a quadrangular portion in FIG. 6.
Figure 8:
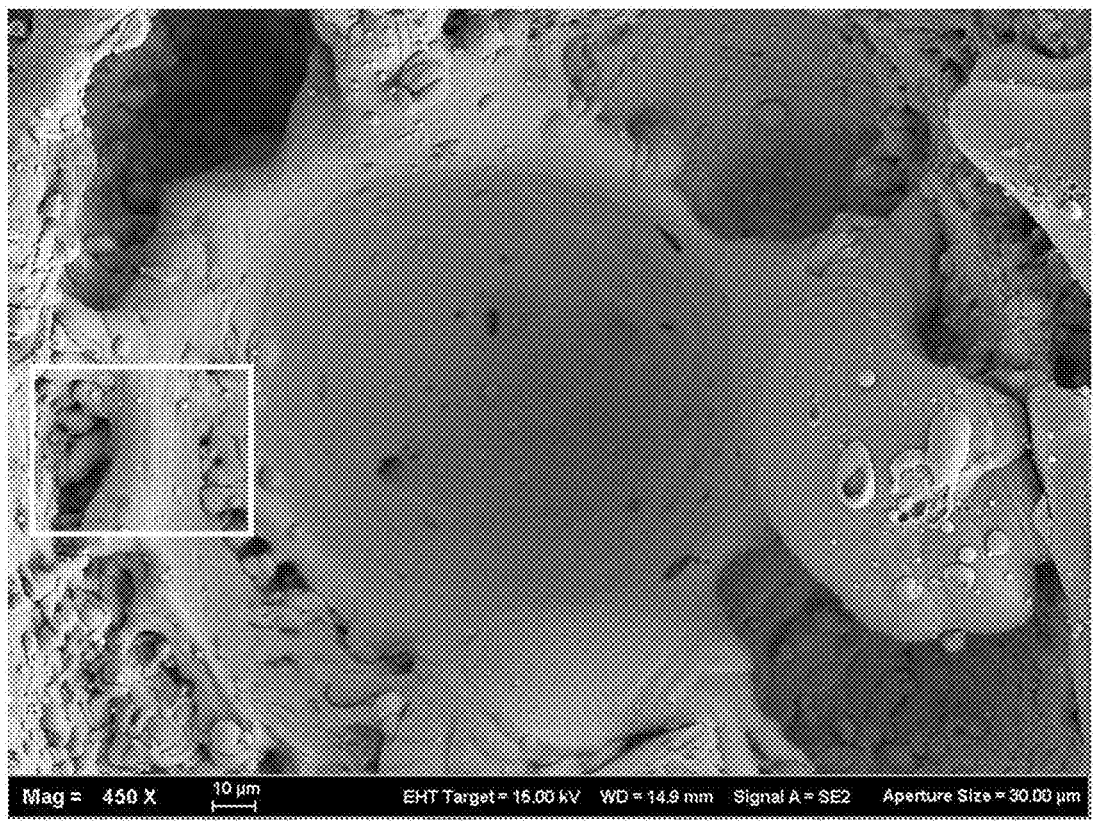
FIG. 8 is a magnification of a quadrangular portion in FIG. 7.
Figure 9:
FIG. 9 is a magnification of a quadrangular portion in FIG. 8.

Specifically, FIG. 6 is a magnification of part of the two-dimensional code C remaining on the sintered product S. FIG. 7 is a magnification of the quadrangular portion in FIG. 6. FIG. 8 is a magnification of the quadrangular portion in FIG. 7. FIG. 9 is a magnification of the quadrangular portion in FIG. 8.

As shown in FIGS. 6 to 9 (particularly FIGS. 7 and 8), the dots each formed at the center of the cell by the second step of the marking process are each a tapered recess whose bottom is rounded, and including an opening portion whose plane shape is substantially circular.

[Observation Result with Microscope]

FIGS. 10 to 17 are each a magnification of the two-dimensional code C and its dotted portion obtained by a microscope.

Figure 10:
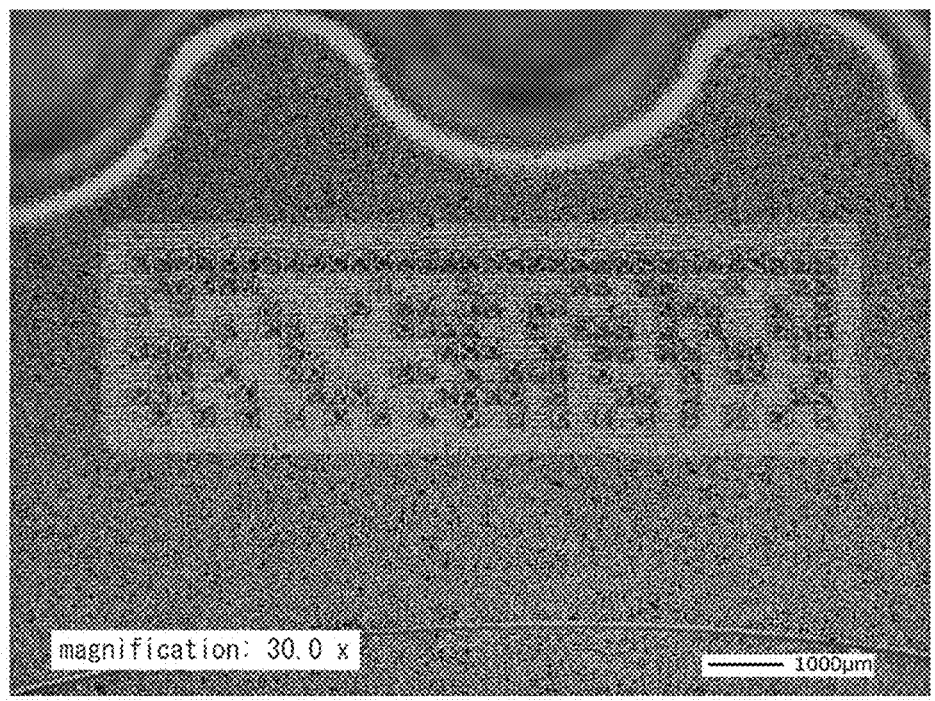
FIG. 10 is a magnification of a two-dimensional code remaining on a sintered product without sizing.

Specifically, FIG. 10 is a magnification of the two-dimensional code C remaining on the sintered product S without the sizing. FIG. 11 is a magnification of the dotted portion (the second step portion) remaining on the sintered product S without the sizing.

FIG. 12 is a magnification of the non-dotted portion (the third step portion) remaining on the sintered product S without the sizing. FIG. 13 is a magnification of the unprocessed portion (outside the first step area) of the sintered product S without the sizing.

Figure 14:
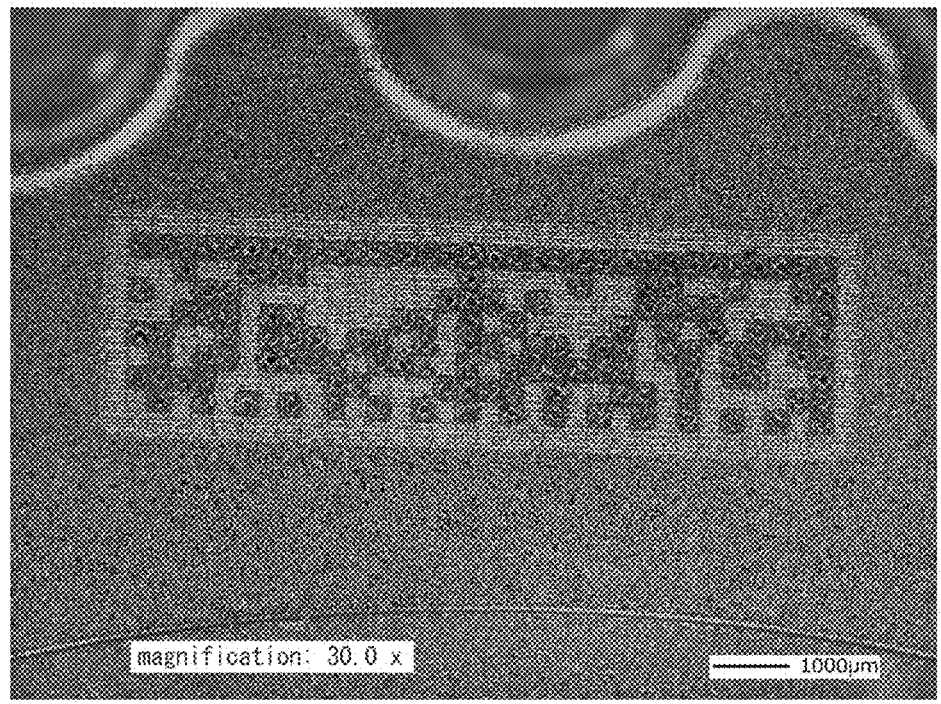
FIG. 14 is a magnification of a two-dimensional code remaining on a sintered product with the sizing.

FIG. 14 is a magnification of the two-dimensional code C remaining on the sintered product S with the sizing. FIG. 15 is a magnification of the dotted portion (the second step portion) remaining on the sintered product S with the sizing.

FIG. 16 is a magnification of the non-dotted portion (the third step portion) remaining on the sintered product S with the sizing. FIG. 17 is a magnification of the unprocessed portion (outside the first step area) of the sintered product S with the sizing.

As shown in FIGS. 11 and 15, the depth of each of the dots formed at the center of the cell in the second step of the marking process is mostly 100 μm.

As can be seen from the comparison between FIG. 11 and FIG. 15, while the periphery of the dot without sizing (FIG. 11) is rough, the periphery of the dot with the sizing (FIG. 15) are less rough by virtue of the sizing.

As can be seen from the comparison between FIG. 12 and FIG. 13, in the non-dotted portion (the third step portion) remaining on the sintered product S without the sizing, as compared to the unprocessed portion (outside the first step area) of the sintered product S without the sizing, the size and density of the voids appearing at the surface are smaller.

Similarly, as can be seen from the comparison between FIG. 16 and FIG. 17, in the non-dotted portion (the third step portion) remaining on the sintered product S with the sizing, as compared to the unprocessed portion (outside the first step area) of the sintered product S with the sizing, the size and density of the voids appearing at the surface are smaller.

[EDS Analysis Result]

FIGS. 18 to 23 each show the analysis result with an energy dispersive X-ray spectrometer (hereinafter referred to as "the EDS") on the dotted portion of the sintered compact.

Specifically, FIG. 18 shows the EDS analysis result on the dotted portion of the sintered compact which has been previously marked and then underwent the sintering process. The analysis range is the quadrangular portion in the FIG. 18. FIG. 19 shows the EDS analysis result on the dotted portion of the sintered compact which has been previously marked and then underwent the sintering process. The analysis point is the cross portion in FIG. 19.

FIG. 20 shows the EDS analysis result on the portion other than the marking-target portion of the sintered compact, and the analysis range is the quadrangular portion in FIG. 20. FIG. 21 shows the EDS analysis result on the portion other than the marking-target portion of the sintered compact, and the analysis point is the cross portion in FIG. 21.

FIG. 22 shows the EDS analysis result on the dotted portion of the sintered compact which has been sintered and then marked, and the analysis range is the quadrangular portion in FIG. 22. FIG. 23 is the EDS analysis result on the dotted portion of the sintered compact which has been sintered and then marked, and the analysis point is the cross portion in FIG. 23.

As shown in FIGS. 18 and 19, the sintered compacts which have been marked and then underwent the sintering process have the oxygen content of 1.33 weight percent and 1.50%, respectively.

These content values are not largely different from the oxygen content of the portions other than the marking-target portion of the sintered compacts (1.98 weight percent in FIG. 20 and 1.80 weight percent in FIG. 21). This may be explained that the metal component heated by the laser light thereby oxidized is reduced in the sintering process after the marking.

On the other hand, as shown in FIGS. 22 and 23, the sintered compacts which have been sintered and then marked have the oxygen content of 10.10 weight percent and 12.76%, respectively.

These content values are largely great (different by an order of magnitude) as compared to the portions other than the marking-target portion of the sintered compacts (1.98 weight percent in FIG. 20 and 1.80 weight percent in FIG. 21). This may be explained that, when the articles are sintered and thereafter marked, the metal component heated by the laser light thereby oxidized remains as it is.

As has been described above, when the marked powder compact G2 has undergone the sintering process, the metal component once oxidized in the marking process is reduced in the sintering process. Therefore, the oxygen content of the dotted portion becomes substantially equal to that of the normal portion, that is, the portion other than the marking-target portion (for example, falls within a range of 1 weight percent to 2 weight percent inclusive).

[Variation]

The foregoing embodiment should be construed as illustrative in every aspect and not limiting. The scope of the present invention is defined not by the foregoing description but by the scope of claims, and intended to include all changes which come within the meaning and range of equivalency of the claims.

For example, in the embodiment, the powder compact G1 on which the two-dimensional code C is marked contains a lubricant. Here, the powder compact G1 may be a tentatively calcined article which is obtained by removing the lubricant by tentative calcination (see Japanese Patent No. 4751159).

That is, the manufacturing method according to the present embodiment may be performed in order of: pressing powder→tentative calcination→marking→finishing calcination.

REFERENCE SIGNS LIST

G1: POWDER COMPACT (BEFORE MARKING)
G2: POWDER COMPACT (AFTER MARKING)
S: SINTERED PRODUCT
C: TWO-DIMENSIONAL CODE

The invention claimed is:

1. A laser marking method for a powder compact containing metal powder, the metal powder being powder containing 90 mass percent or more of iron-based material powder having an average particle size of 20 to 200 μm, the laser marking method comprising:
   a first step of scanning with laser light of first power over a predetermined area in a surface of the powder compact, to melt and smooth inside of the predetermined area, wherein the surface of the powder compact formed by the first step is smaller in porosity than a normal surface not subjected to the first step; and
   a second step of scanning with laser light of second power to form a dot formed of a recess of a predetermined depth at a predetermined location in the predetermined area,
   wherein the first power is weaker than the second power.

2. The laser marking method according to claim 1, wherein the second step includes a step of performing, for a plurality of times, rotary irradiation of rotationally irradiating inside a cell in the predetermined area with the laser light spirally from outside to inside.

3. The laser marking method according to claim 1, wherein
   the first power falls within a range of 10 W to 25 W inclusive, and
   the second power falls within a range of 20 W to 50 W inclusive.

4. The laser marking method according to claim 1, wherein
   a scan speed of the laser light of the first power is 1500 mm/s or more and 2700 mm/s or less, and
   a scan speed of the laser light of the second power is 250 mm/s or more and 320 mm/s or less.

5. The laser marking method according to claim 1, further comprising a third step of scanning with laser light of third power which is weaker than the second power over a portion excluding the dot formed by the second step in the predetermined area.

6. The laser marking method according to claim 5, wherein the third power falls within a range of 10 W to 25 W inclusive.

7. The laser marking method according to claim 5, wherein a scan speed of the laser light of the third power is 1700 mm/s or more and 3000 mm/s or less.

8. The laser marking method according to claim 1, wherein
- a surface of the powder compact formed by the first step is smaller in porosity than a normal surface not subjected to the first step, and
- the dot formed by the second step is a tapered recess whose bottom is rounded, the dot including an opening portion whose plane shape is substantially circular.

9. A sintered product obtained by sintering a powder compact containing metal powder, the metal powder being powder containing 90 mass percent or more of iron-based material powder having an average particle size of 20 to 200 μm, the sintered product comprising
- a two-dimensional code including a plurality of dots marked by laser marking on a surface of the powder compact, wherein
- an oxygen content at a surface of the sintered product near the dots is 2 weight percent or less, and
- the surface of the powder compact having the plurality of dots has a smaller porosity than a surface of the powder compact where the laser marking is not performed.

* * * * *